United States Patent
Wheatley et al.

(10) Patent No.: US 9,410,677 B2
(45) Date of Patent: *Aug. 9, 2016

(54) LIGHT SOURCE AND DISPLAY SYSTEM INCORPORATING SAME

(71) Applicant: 3M INNOVATIVE PROPERTIES COMPANY, St. Paul, MN (US)

(72) Inventors: John A. Wheatley, Lake Elmo, MN (US); Tao Liu, Woodbury, MN (US); Encai Hao, Woodbury, MN (US); William Blake Kolb, West Lakeland, MN (US); Michael Benton Free, Saint Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/579,951

(22) Filed: Dec. 22, 2014

(65) Prior Publication Data
US 2015/0103507 A1 Apr. 16, 2015

Related U.S. Application Data

(63) Continuation of application No. 13/502,060, filed as application No. PCT/US2010/053719 on Oct. 22, 2010, now Pat. No. 8,922,733.

(60) Provisional application No. 61/254,672, filed on Oct. 24, 2009.

(51) Int. Cl.
 *F21V 9/14* (2006.01)
 *F21V 13/14* (2006.01)
 (Continued)

(52) U.S. Cl.
 CPC . *F21V 13/14* (2013.01); *F21V 9/14* (2013.01); *G02B 6/005* (2013.01); *G02B 6/0096* (2013.01); *G02F 1/133602* (2013.01); *G02B 6/0051* (2013.01)

(58) Field of Classification Search
 CPC .......... F21V 13/14; F21V 9/14; G02B 6/005; G02B 6/0051; G02B 6/0096

USPC ...................... 362/97.1, 19, 600–634; 349/64
See application file for complete search history.

(56) References Cited

U.S. PATENT DOCUMENTS

| 2,976,576 A | 3/1961 | Wichterle |
| 3,610,729 A | 10/1971 | Rogers |

(Continued)

FOREIGN PATENT DOCUMENTS

| DE | 10-2007-063471 | 12/2008 |
| EP | 1002830 | 5/2000 |

(Continued)

OTHER PUBLICATIONS

ASTM Designation: D 1003-00, "Standard Test Method for Haze and Luminous Transmittance of Transparent Plastics", 2000, pp. 198-203.

(Continued)

*Primary Examiner* — Julie Bannan
*Assistant Examiner* — Jessica M Apenteng
(74) *Attorney, Agent, or Firm* — Lisa P. Fulton; Daniel J. Iden

(57) ABSTRACT

Light sources are disclosed. A disclosed light source includes an optically reflective cavity that includes an input port for receiving light and an output port for transmitting light, a lamp that is disposed at the input port, and an optical stack that is disposed at the output port. The optical stack includes a forward scattering optical diffuser that is disposed at the output port and has an optical haze that is not less than about 20%, and an optical film that is disposed on the optical diffuser. The optical film enhance total internal reflection at the interface between the optical film and the optical diffuser. The optical film has an index of refraction that is not greater than about 1.3 and an optical haze that is not greater than about 5%. The optical stack also includes a reflective polarizer layer that is disposed on the optical film. Substantial portions of each two neighboring major surfaces in the optical stack are in physical contact with each other.

10 Claims, 16 Drawing Sheets

(51) Int. Cl.
*F21V 8/00* (2006.01)
*G02F 1/1335* (2006.01)

(56) References Cited

U.S. PATENT DOCUMENTS

| | | |
|---|---|---|
| 3,691,140 A | 9/1972 | Silver |
| 4,166,152 A | 8/1979 | Baker |
| 4,212,048 A | 7/1980 | Castleberry |
| 4,446,305 A | 5/1984 | Rogers |
| 4,539,256 A | 9/1985 | Shipman |
| 4,726,989 A | 2/1988 | Mrozinski |
| 4,906,070 A | 3/1990 | Cobb, Jr. |
| 4,968,562 A | 11/1990 | Delgado |
| 4,994,322 A | 2/1991 | Delgado |
| 5,056,892 A | 10/1991 | Cobb, Jr. |
| 5,120,594 A | 6/1992 | Mrozinski |
| 5,238,623 A | 8/1993 | Mrozinski |
| 5,296,277 A | 3/1994 | Wilson |
| 5,362,516 A | 11/1994 | Wilson |
| 5,486,949 A | 1/1996 | Schrenk |
| 5,528,720 A | 6/1996 | Winston |
| 5,691,846 A | 11/1997 | Benson, Jr. |
| 5,711,589 A | 1/1998 | Oe |
| 5,808,709 A | 9/1998 | Davis |
| 5,808,713 A | 9/1998 | Broer |
| 5,845,035 A | 12/1998 | Wimberger-Friedl |
| 5,882,774 A | 3/1999 | Jonza |
| 5,919,555 A | 7/1999 | Yasuda |
| 5,992,066 A | 11/1999 | Brauer |
| 5,993,954 A | 11/1999 | Radovanovic |
| 6,090,861 A | 7/2000 | Mendenhall |
| 6,157,490 A | 12/2000 | Wheatley |
| 6,166,855 A | 12/2000 | Ikeyama |
| 6,197,397 B1 | 3/2001 | Sher |
| 6,204,202 B1 | 3/2001 | Leung |
| 6,208,466 B1 | 3/2001 | Liu |
| 6,210,858 B1 | 4/2001 | Yasuda |
| 6,224,223 B1 | 5/2001 | Higuchi |
| 6,280,063 B1 | 8/2001 | Fong |
| 6,352,761 B1 | 3/2002 | Hebrink |
| 6,355,759 B1 | 3/2002 | Sherman |
| 6,368,699 B1 | 4/2002 | Gilbert |
| 6,457,823 B1 | 10/2002 | Cleary |
| 6,461,724 B1 | 10/2002 | Radovanovic |
| 6,559,909 B1 | 5/2003 | Kushida |
| 6,573,305 B1 | 6/2003 | Thunhorst |
| 6,688,751 B2 | 2/2004 | Lee |
| 6,703,463 B2 | 3/2004 | Holguin |
| 6,719,426 B2 | 4/2004 | Magarill |
| 6,783,349 B2 | 8/2004 | Neavin |
| 6,846,089 B2 | 1/2005 | Stevenson |
| 6,890,642 B2 | 5/2005 | Kaminsky |
| 6,924,014 B2 | 8/2005 | Ouderkirk |
| 6,927,911 B2 | 8/2005 | Tsai |
| 6,958,860 B2 | 10/2005 | Dontula |
| 6,987,612 B2 | 1/2006 | Allen |
| 6,996,296 B2 | 2/2006 | Bastiaansen |
| 6,999,233 B2 | 2/2006 | Allen |
| 7,027,671 B2 | 4/2006 | Huck |
| 7,068,910 B2 | 6/2006 | Duine |
| 7,072,544 B2 | 7/2006 | Cornelissen |
| 7,132,136 B2 | 11/2006 | Laney |
| 7,157,839 B2 | 1/2007 | Ouderkirk |
| 7,185,993 B2 | 3/2007 | Smith |
| 7,204,616 B2 | 4/2007 | Kitamura |
| 7,309,135 B2 | 12/2007 | Smith |
| 7,315,671 B2 | 1/2008 | Huck |
| 7,327,415 B2 | 2/2008 | Brickey |
| 7,372,075 B2 | 5/2008 | Shigemura |
| 7,379,130 B1 | 5/2008 | Bhalla |
| 7,466,373 B2 | 12/2008 | Xu |
| 7,517,129 B2 | 4/2009 | Choi |
| 7,526,164 B2 | 4/2009 | Ouderkirk |
| 7,599,592 B2 | 10/2009 | Benson, Jr. |
| 7,857,471 B2 | 12/2010 | Ohta et al. |
| 8,008,362 B2 | 8/2011 | Schadler |
| 2003/0118750 A1 | 6/2003 | Bourdelais |
| 2003/0118807 A1 | 6/2003 | Laney |
| 2003/0170442 A1 | 9/2003 | Kaminsky |
| 2004/0056994 A1 | 3/2004 | Honda |
| 2004/0164325 A1 | 8/2004 | Siegel |
| 2004/0233657 A1 | 11/2004 | Lin |
| 2006/0019114 A1 | 1/2006 | Thies |
| 2006/0056166 A1 | 3/2006 | Yeo |
| 2006/0082699 A1 | 4/2006 | Gehlsen |
| 2006/0082700 A1 | 4/2006 | Gehlsen |
| 2006/0215079 A1 | 9/2006 | Suzuki |
| 2006/0245718 A1 | 11/2006 | Winston |
| 2006/0246233 A1 | 11/2006 | Fukuda |
| 2006/0275595 A1 | 12/2006 | Thies |
| 2007/0000606 A1 | 1/2007 | Steelman |
| 2007/0018308 A1 | 1/2007 | Schott |
| 2007/0020404 A1 | 1/2007 | Seiberle |
| 2007/0047259 A1 | 3/2007 | Lee |
| 2007/0052882 A1 | 3/2007 | Hwang |
| 2007/0065638 A1 | 3/2007 | Wang |
| 2007/0189038 A1 | 8/2007 | Pokorny |
| 2007/0286993 A1 | 12/2007 | Radcliffe |
| 2008/0037127 A1 | 2/2008 | Weber |
| 2008/0043490 A1 | 2/2008 | Coleman |
| 2008/0064133 A1 | 3/2008 | Lee |
| 2008/0151375 A1 | 6/2008 | Lin |
| 2008/0186738 A1 | 8/2008 | Kim |
| 2008/0192352 A1 | 8/2008 | Laney |
| 2008/0198293 A1 | 8/2008 | Boonekamp |
| 2008/0214075 A1 | 9/2008 | Marte |
| 2008/0220554 A1 | 9/2008 | Shigemura |
| 2008/0248312 A1 | 10/2008 | Thies |
| 2008/0252823 A1 | 10/2008 | Hwang |
| 2008/0291696 A1 | 11/2008 | Kim |
| 2008/0300339 A1 | 12/2008 | Wright |
| 2008/0305282 A1 | 12/2008 | Inakura |
| 2009/0005468 A1 | 1/2009 | Schadler |
| 2009/0029145 A1 | 1/2009 | Thies |
| 2010/0156953 A1 | 6/2010 | Nevitt |
| 2010/0208349 A1 | 8/2010 | Beer |
| 2010/0238686 A1 | 9/2010 | Weber |
| 2010/0265584 A1 | 10/2010 | Coggio |
| 2011/0102891 A1 | 5/2011 | Derks |
| 2011/0222263 A1 | 9/2011 | Weber |
| 2011/0222295 A1 | 9/2011 | Weber |
| 2011/0228511 A1 | 9/2011 | Weber |
| 2011/0279997 A1* | 11/2011 | Weber .................. G02B 5/0841 362/19 |
| 2012/0021134 A1 | 1/2012 | Kolb |
| 2012/0026431 A1* | 2/2012 | Coggio ................ G02B 6/0051 349/65 |
| 2012/0027945 A1 | 2/2012 | Kolb |
| 2012/0038850 A1 | 2/2012 | Hao |
| 2012/0038990 A1 | 2/2012 | Hao |
| 2012/0039089 A1* | 2/2012 | Hao ........................ G02B 5/02 362/607 |

FOREIGN PATENT DOCUMENTS

| | | |
|---|---|---|
| EP | 1022587 | 7/2000 |
| EP | 1256834 | 11/2002 |
| EP | 1450202 | 8/2004 |
| EP | 1479734 | 11/2004 |
| EP | 1855150 | 11/2007 |
| FR | 2908523 | 5/2008 |
| GB | 1188736 | 3/1968 |
| JP | 2001-049008 A | 2/2001 |
| JP | 2004-013059 A | 1/2004 |
| JP | 2005-266343 | 3/2004 |
| JP | 2004-102003 A | 4/2004 |
| JP | 2004-235103 | 8/2004 |
| JP | 3127236 U | 11/2006 |
| JP | 2008-003243 | 1/2008 |
| JP | 2009-205968 A | 9/2009 |
| KR | 2002-0003667 | 1/2002 |
| WO | WO 00-56556 | 9/2000 |
| WO | WO 01-04954 | 1/2001 |
| WO | WO 2006-054197 | 5/2006 |

(56) References Cited

FOREIGN PATENT DOCUMENTS

| WO | WO 2006-096258 | 9/2006 |
| --- | --- | --- |
| WO | WO 2006-120638 | 11/2006 |
| WO | WO 2006-124588 | 11/2006 |
| WO | WO 2007-065847 | 6/2007 |
| WO | WO 2008-011919 | 1/2008 |
| WO | WO 2008-098872 | 8/2008 |
| WO | WO 2008-144136 | 11/2008 |
| WO | WO 2008-144644 | 11/2008 |
| WO | WO 2008-144656 | 11/2008 |
| WO | WO 2009-006252 | 1/2009 |
| WO | WO 2009-100307 A1 | 8/2009 |
| WO | WO 2009-123928 | 10/2009 |
| WO | WO 2010-120845 | 10/2010 |
| WO | WO 2010-120864 | 10/2010 |
| WO | WO 2010-120971 | 10/2010 |
| WO | WO 2011-049751 | 4/2011 |
| WO | WO 2011-050226 | 4/2011 |
| WO | WO 2011-050228 | 4/2011 |
| WO | WO 2011-050232 | 4/2011 |
| WO | WO 2011-050236 | 4/2011 |
| WO | WO 2011-050268 | 4/2011 |
| WO | WO 2011-071728 | 6/2011 |
| WO | WO 2011-129848 | 10/2011 |
| WO | WO 2012-054318 | 4/2012 |

OTHER PUBLICATIONS

Azzam, "Reflection and Transmission of Polarized Light", Ellipsometry and Polarized Light, Published by North-Holland Publishing Company, 1977, pp. 340-352.

Berremen and Scheffer, "Bragg Reflection of Light From Single-Domain Cholesteric Liquid-Crystal Films", Physical Review letters, 1970, vol. 25, No. 9, pp. 577-581.

Cornelissen, Efficient and Cost-Effective Polarized-Light Backlights for LCDs, Proceedings of SPIE, vol. 7058, pp. 1-10, (2008).

Haze, Applications Note, Insight on Color, vol. 9, No. 6, 2008, pp. 1-4.

Jagt, "Polymeric Polarisation Optics for Energy Efficient LCD Illumination", PhD theses, 2001, pp. 1-226.

Ibn-Elhaj, Nature, "Optical Polymer Thin Films with Isotropic and Anisotropic Nano-Corrugated Surface Topologies", Letters to Nature, Apr. 12, 2001, vol. 410, pp. 796-799.

Oliveri, "Fabrication and Characterization of Polymeric Optical Waveguides Using Standard Silicon Processing Technology", Fibres and Optical Passive Components, Proceedings of 2005/IEEE/LEOS Workshop on Jun. 22-24, 2005, pp. 1-6.

Peng, "Enhanced Coupling of Light from Organic Light Emitting Diodes using Nanoporous Films", Journal of Applied Physics, Aug. 1, 2004, vol. 96, No. 3, pp. 1649-1654.

Risk, "Optical Waveguides with an Aqueous Core and a Low-Index Nanoporous Cladding", Optics Express, Dec. 27, 2004, vol. 12, No. 26, pp. 6446-6455.

Tsutsui, "Doubling Coupling-Out Efficiency in Organic Light-Emitting Devices Using a Thin Silica Aerogel Layer", Advanced Materials, Aug. 3, 2001, vol. 13, No. 15, pp. 1149-1152.

Walheim, "Nanophase-Seperated Polymer Films as High-Performance AntiReflection Coatings", Science, Jan. 22, 1999, vol. 283, pp. 520-522.

Yang, "Polarized light-guide for liquid crystal display", Optics Express, Oct. 17, 2005, vol. 13, No. 21, pp. 8349-8356.

Yu, "Comparison of Different Measurement Methods for Transmittance Haze", Metrologia, 2009, vol. 46, pp. 233-237. (XP002603289).

International Search Report for PCT/US2010/031010, mailed Aug. 17, 2010, 8 pages.

International Search Report for PCT/US2010/031149, mailed Jun. 22, 2010, 6 pages.

International Search Report for PCT/US2010/030984, mailed Oct. 14, 2010, 5 pages.

International Search Report for PCT/US2010/053719, mailed Feb. 15, 2011, 3 pages.

International Search Report for PCT/US2010/058526, mailed Feb. 25, 2011, 5 pages.

International Search Report for PCT/US2010/053751, mailed Mar. 18, 2011, 7 pages.

International Search Report for PCT/US2010/053673, mailed Jun. 30, 2011, 3 pages.

* cited by examiner

LIGHT SOURCE AND DISPLAY SYSTEM INCORPORATING SAME

CROSS REFERENCE TO RELATED APPLICATIONS

This application is a continuation of U.S. application Ser. No. 13/502,060, filed on Apr. 13, 2012, which is a national stage filing under 35 U.S.C. 371 of PCT/US2010/053719, filed on Oct. 22, 2010, which claims priority to U.S. Provisional Application No. 61/254,672, filed on Oct. 24, 2009, the disclosure of which is incorporated by reference in its/their entirety herein.

RELATED APPLICATIONS

This application is related to the following U.S. patent applications which are incorporated herein in their entireties by reference: "Optical Film" filed on Apr. 15, 2009 and having Ser. No. 61/169,466; "Optical Construction and Display System Incorporating Same" filed on Apr. 15, 2009 and having Ser. No. 61/169,521; "Retroreflecting Optical Construction" filed on Apr. 15, 2009 and having Ser. No. 61/169,532; "Optical Film for Preventing Optical Coupling" filed on Apr. 15, 2009 and having Ser. No. 61/169,549; "Backlight and Display System Incorporating Same" filed on Apr. 15, 2009 and having Ser. No. 61/169,555; "Process and Apparatus for Coating with Reduced Defects" filed on Apr. 15, 2009 and having Ser. No. 61/169,427; "Process and Apparatus for A Nanovoided Article" filed on Apr. 15, 2009 and having Ser. No. 61/169,429; and "Optical Construction and Method of Making the Same" filed on Oct. 22, 2009 and having Ser. No. 61/254,243.

This application is further related to the following U.S. patent applications, filed on even date herewith and which are incorporated herein in their entireties by reference: "Gradient Low Index Article and Method" having Ser. No. 61/254,673; "Process for Gradient Nanovoided Article" having Ser. No. 61/254,674; "Immersed Reflective Polarizer with High Off-Axis Reflectivity" having Ser. No. 61/254,691; "Immersed Reflective Polarizer With Angular Confinement in Selected Planes of Incidence" having Ser. No. 61/254,692; and "Voided Diffuser" having Ser. No. 61/254,676.

FIELD OF THE INVENTION

This invention generally relates to light sources that include a hollow optically reflective cavity and an optical film that exhibits some low-refractive index-like properties. The invention also relates to illumination devices, backlights and display systems that incorporate such light sources.

BACKGROUND

Backlights are used as extended area illumination sources in displays such as liquid crystal displays (LCDs). Backlights typically incorporate a light source that includes one or more lamps, a lightguide for producing an extended area light source by extending light from the lamps over the output surface of the backlight, and one or more light management layers such as prismatic light redirecting layers, brightness enhancement layers, reflective polarizer layers, diffuser layers, mirror layers and retarder layers. Lightguides are typically solid and include means for extracting light from the lightguide.

SUMMARY OF THE INVENTION

Generally, the present inventions relates to light sources. In one embodiment, a light source includes a reflective cavity that includes an input port for receiving light and an output port for transmitting light. The light source also includes a lamp that is disposed at the input port. The light source also includes an optical stack that is disposed at the output port and includes a substantially forward scattering optical diffuser that is disposed at the output port and has an optical haze that is not less than about 20%, an optical film that is disposed on the optical diffuser for enhancing total internal reflection at the interface between the optical film and the optical diffuser. The optical film has an index of refraction that is not greater than about 1.3 and an optical haze that is not greater than about 5%. The optical stack also includes a reflective polarizer layer that is disposed on the optical film. Substantial portions of each two neighboring major surfaces in the optical stack are in physical contact with each other. In some cases, the ratio of the maximum lateral dimension of the optically reflective cavity to the maximum thickness of the optically reflective cavity is not less than about 20, or not less than about 40, or not less than about 60. In some cases, the lamp includes an LED. In some cases, the cavity includes input ports on opposite sides of the cavity. In some cases, the output port of the cavity is located on a top side of the cavity. In some cases, the optical diffuser has a transport ratio that is not less than about 0.2, or not less than about 0.3, or not less than about 0.4, or not less than about 0.5. In some cases, the optical diffuser is a semi-specular partial reflector. In some cases, the optical haze of the optical diffuser is not less than about 30%, or not less than about 40%. In some cases, the optical diffuser includes a surface diffuser, or a volume diffuser, or a combination of a volume diffuser and a surface diffuser. In some cases, the effective index of refraction of the optical film is not greater than about 1.25, or not greater than about 1.2, or not greater than about 1.15, or not greater than about 1.1. In some cases, the optical haze of the optical film is not greater than about 4%, or not greater than about 3%, or not greater than about 2%. In some cases, the optical film includes a plurality of interconnected voids, and in some cases, the optical film also includes particles that can, for example, be or include fumed silica. In some cases, the optical film is laminated to the optical diffuser via an optical adhesive layer. In some cases, the optical film is coated on the reflective polarizer layer. In some cases, the optical stack includes an optical adhesive layer that is disposed on the reflective polarizer layer. In some cases, the reflective polarizer layer includes a multilayer optical film wherein at least some of the layers are birefringent. In some cases, the reflective polarizer layer includes a wire grid reflective polarizer, or a reflective fiber polarizer, or a cholesteric reflective polarizer, or a diffusely reflective polarizing film (DRPF). In some cases, the optically reflective cavity includes one or more specularly reflective side reflectors for at least partially collimating light that is emitted by the lamps. In some cases, the cavity includes a specularly reflective back reflector that faces the output port. In some cases, at least 50%, or at least 70%, or at least 90%, of each two neighboring major surfaces in the optical stack are in physical contact with each other. In some cases, the optical film is disposed between the reflective polarizer layer and the optical diffuser. In some cases, the light source is included in a backlight in a display system.

In another embodiment, a light source includes a reflective cavity that includes an input port for receiving light and an output port for transmitting light, a lamp disposed at the input port, and an optical stack that is disposed at the output port and includes an optical film that is disposed at the output port and has an optical haze that is not less than about 30%, and a reflective polarizer layer that is disposed on the optical film, where substantial portions of each two neighboring major surfaces in the optical stack are in physical contact with each other. In some cases, the ratio of the maximum lateral dimension of the cavity to the maximum thickness of the cavity is not less than about 20, or not less than about 40, or not less than about 60. In some cases, the lamp includes an LED. In some cases, the cavity includes input ports located on opposite sides of the cavity. In some cases, the output port of the cavity is located on the top side of the cavity. In some cases, the optical film has a transport ratio that is not less than about 0.2, or not less than about 0.3, or not less than about 0.4, or not less than about 0.5. In some cases, the optical haze of the optical film is not less than about 40%, or not less than about 50%. In some cases, the optical film includes a binder, a plurality of interconnected voids, and a plurality of particles, where the particles can include fumed silica. In some cases, the optical film is laminated to the reflective polarizer layer via an optical adhesive layer. In some cases, the optical film is directly coated on the reflective polarizer layer. In some cases, the optical stack includes an optically adhesive layer that is disposed on the reflective polarizer layer. In some cases, the reflective polarizer layer includes a multilayer optical film, or a wire grid reflective polarizer, or reflective fiber polarizer, or a cholesteric reflective polarizer, or a diffusely reflective polarizing film (DRPF). In some cases, the cavity comprises a specularly reflective side reflector at least partially collimating light that is emitted by the lamp. In some cases, the cavity includes a specularly reflective back reflector that faces the output port. In some cases, at least 50%, or at least 70%, or at least 90%, of each two neighboring major surfaces in the optical stack are in physical contact with each other.

In another embodiment, a light source includes an optically reflective cavity that includes an input port for receiving light and an output port for transmitting light, a lamp that is disposed at the input ports, and an optical stack that is disposed at the output port and includes an optical diffuser that is disposed at the output port and has an optical haze that is not less than about 20% and an optical film that is disposed on the optical diffuser for enhancing total internal reflection at the interface between the optical film and the optical diffuser. The optical film has an index of refraction that is not greater than about 1.3 and an optical haze that is not greater than about 5%. The optical stack also includes a partially reflective partially transmissive layer that is disposed on the optical film. Substantial portions of each two neighboring major surfaces in the optical stack are in physical contact with each other.

In another embodiment, a light source includes an optically reflective hollow cavity that includes an input port for receiving light, a first output port for transmitting light, a second output port for transmitting light, and a lamp that is disposed at the input ports, a first optical stack that is disposed at the first output port, and a different second optical stack that is disposed at the second output port. At least one of the optical stacks includes an optical film that has an optical haze that is not less than about 30%, and a reflective polarizer layer that is disposed on the optical film, where substantial portions of each two neighboring major surfaces in the optical stack are in physical contact with each other. In some cases, a display system includes a first liquid crystal panel that is disposed on the first optical stack, and a second liquid crystal panel that is disposed on the second optical stack.

BRIEF DESCRIPTION OF DRAWINGS

The invention may be more completely understood and appreciated in consideration of the following detailed description of various embodiments of the invention in connection with the accompanying drawings, in which.

In the specification, a same reference numeral used in multiple figures refers to the same or similar elements having the same or similar properties and functionalities.

DETAILED DESCRIPTION

Figure 1:
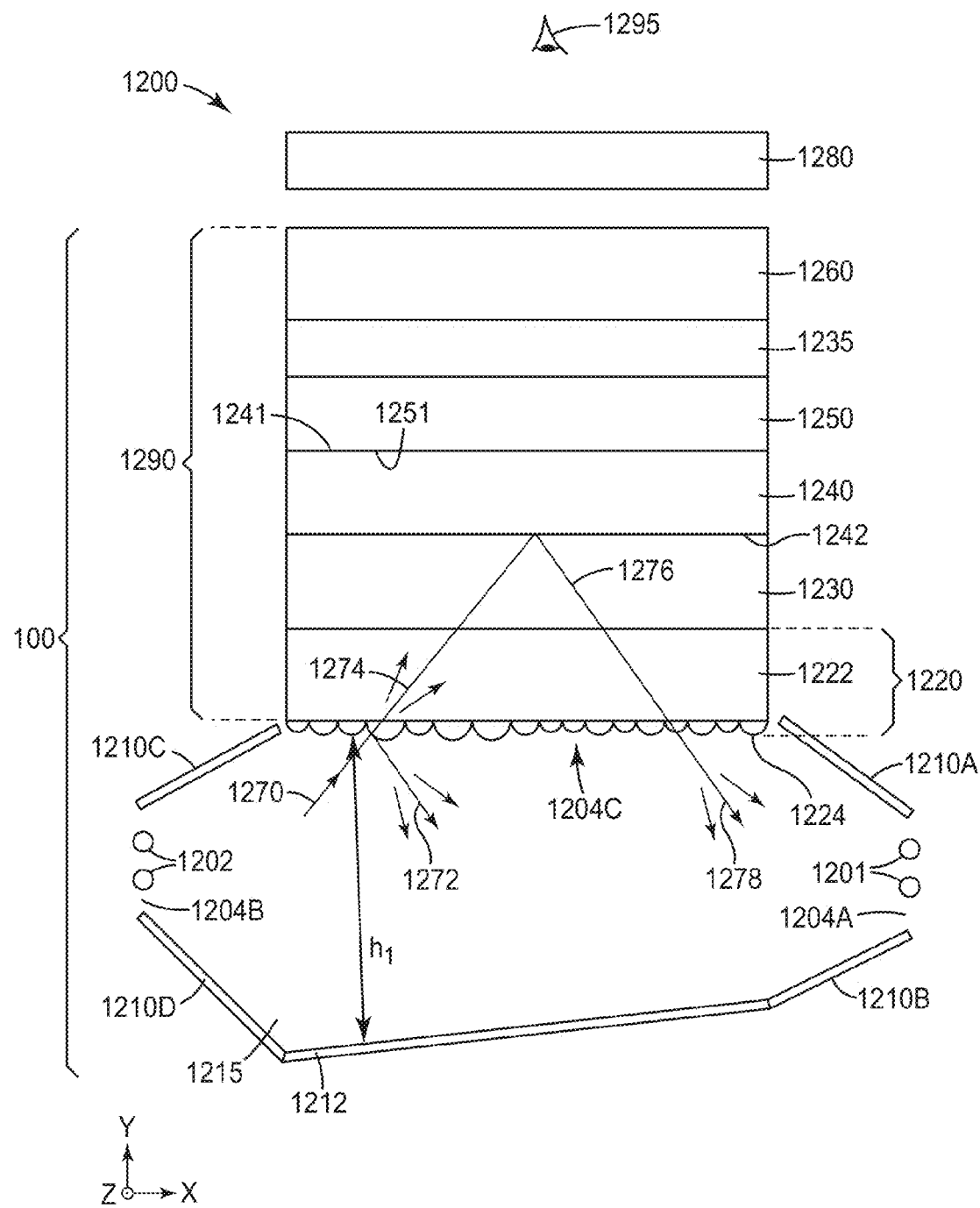
FIG. 1 is a schematic side-view of a display system.

This invention generally relates to light sources that include a hollow reflective cavity and an optical film that has a low effective index of refraction or exhibits some low-refractive index-like properties. In some cases, the disclosed light sources are extended light sources and can advantageously be incorporated into displays, such as liquid crystal displays (LCDs), to provide extended illumination to an image forming panel. Displays incorporating the disclosed light sources can have reduced thickness and weight. The disclosed light sources can utilize fewer lamps and provide uniform illumination over an extend area by efficient light mixing.

The disclosed light sources include an optical film that, in some cases, has a low optical haze and a low effective index of refraction, such as an optical haze of less than about 5% and an effective index of refraction that is less than about 1.3. In some cases, the optical film has a high optical haze and/or high diffuse optical reflectance while exhibiting some low-refractive-index-like optical properties, such as, for example, the ability to support total internal reflection or enhance internal reflection.

The optical films disclosed herein include a plurality of voids, such as a plurality of interconnected voids or a network of voids, dispersed in a binder. The voids in the plurality of interconnected voids are connected to one another via hollow tunnels or hollow tunnel-like passages. The voids are not necessarily free of all matter and/or particulates. For example, in some cases, a void may include one or more small fiber- or string-like objects that include, for example, a binder and/or nano-particles. Some disclosed optical films include multiple pluralities of interconnected voids or multiple networks of voids where the voids in each plurality or network are interconnected. In some cases, in addition to multiple pluralities of interconnected voids, the disclosed optical films include a plurality of closed or unconnected voids meaning that the voids are not connected to other voids via tunnels.

Some disclosed optical films support total internal reflection (TIR) or enhanced internal reflection (EIR) by virtue of including a plurality of voids. When light that travels in an optically clear non-porous medium is incident on a stratum possessing high porosity, the reflectivity of the incident light is much higher at oblique angles than at normal incidence. In the case of no or low haze voided films, the reflectivity at oblique angles greater than the critical angle is close to about 100%. In such cases, the incident light undergoes total internal reflection (TIR). In the case of high haze voided films, the oblique angle reflectivity can be close to 100% over a similar range of incident angles even though the light may not undergo TIR. This enhanced reflectivity for high haze films is similar to TIR and is designated as Enhanced Internal Reflectivity (EIR). As used herein, by a porous or voided optical film enhancing internal reflection (EIR), it is meant that the reflectance at the boundary of the voided and non-voided strata of the film or film laminate is greater with the voids than without the voids.

The voids in the disclosed optical films have an index of refraction $n_v$ and a permittivity $\epsilon_v$, where $n_v^2 = \epsilon_v$, and the binder has an index of refraction $n_b$ and a permittivity $\epsilon_b$, where $n_b^2 = \epsilon_b$. In general, the interaction of an optical film with light, such as light that is incident on, or propagates in, the optical film, depends on a number of film characteristics such as, for example, the film thickness, the binder index, the void or pore index, the pore shape and size, the spatial distribution of the pores, and the wavelength of light. In some cases, light that is incident on or propagates within the optical film, "sees" or "experiences" an effective permittivity $\epsilon_{eff}$ and an effective index $n_{eff}$, where $n_{eff}$ can be expressed in terms of the void index $n_v$, the binder index $n_b$, and the film porosity or void volume fraction "f". In such cases, the optical film is sufficiently thick and the voids are sufficiently small so that light cannot resolve the shape and features of a single or isolated void. In such cases, the size of at least a majority of the voids, such as at least 60% or 70% or 80% or 90% of the voids, is not greater than about λ/5, or not greater than about λ/6, or not greater than about λ/8, or not greater than about λ/10, or not greater than about λ/20, where λ is the wavelength of light.

In some cases, light that is incident on a disclosed optical film is a visible light meaning that the wavelength of the light is in the visible range of the electromagnetic spectrum. In such cases, the visible light has a wavelength that is in a range from about 380 nm to about 750 nm, or from about 400 nm to about 700 nm, or from about 420 nm to about 680 nm. In such cases, the optical film can reasonably be assigned an effective index of refraction if the size of at least a majority of the voids, such as at least 60% or 70% or 80% or 90% of the voids, is not greater than about 70 nm, or not greater than about 60 nm, or not greater than about 50 nm, or not greater than about 40 nm, or not greater than about 30 nm, or not greater than about 20 nm, or not greater than about 10 nm.

In some cases, the disclosed optical films are sufficiently thick so that the optical film can reasonably have an effective index that can be expressed in terms of the indices of refraction of the voids and the binder, and the void or pore volume fraction or porosity. In such cases, the thickness of the optical film is not less than about 100 nm, or not less than about 200 nm, or not less than about 500 nm, or not less than about 700 nm, or not less than about 1000 nm.

When the voids in a disclosed optical film are sufficiently small and the optical film is sufficiently thick, the optical film has an effective permittivity $\epsilon_{eff}$ that can be expressed as:

$$\epsilon_{eff} = f\epsilon_v + (1-f)\epsilon_b \tag{1}$$

In such cases, the effective index $n_{eff}$ of the optical film can be expressed as:

$$n_{eff}^2 = fn_v^2 + (1-f)n_b^2 \tag{2}$$

In some cases, such as when the difference between the indices of refraction of the pores and the binder is sufficiently small, the effective index of the optical film can be approximated by the following expression:

$$n_{eff} = fn_v + (1-f)n_b \tag{3}$$

In such cases, the effective index of the optical film is the volume weighted average of the indices of refraction of the voids and the binder. For example, an optical film that has a void volume fraction of about 50% and a binder that has an index of refraction of about 1.5, has an effective index of about 1.25.

FIG. 1 is a schematic side-view of a display system 1200 that includes a liquid crystal panel 1280 disposed on an extended light source 100. Light source 100 includes an optical stack 1290 that is disposed on and receives light from an optically reflective cavity 1215.

Optically reflective cavity 1215 includes at least one specularly reflective reflector, an input port for receiving light from a lamp, an output port for transmitting light, and means for improving collimation of light emitted by the lamp, where the improved collimation is in the xz-plane or along a lateral direction, such as along the length and/or width direction, of the optically reflective cavity. In particular, optically reflective cavity 1215 includes specularly reflective side reflectors 1210A and 1210B and an input port 1204A on one (right) side of the optical cavity, specularly reflective side reflectors 1210C and 1210D and an input port 1204B on the opposite (left) side of the optical cavity, lamps 1201 at input port 1204A, and lamps 1202 at input port 1204B. Light that is emitted by lamps 1201 is collimated, or partially collimated, by specular side-reflectors 1210A and 1210B generally along the length (x−) direction of the optically reflective cavity. Similarly, light that is emitted by lamps 1202 is collimated, or partially collimated, by specular side-reflectors 1210C and 1210D generally along the length (x−) direction of the optically reflective cavity. Optically reflective cavity 1215 also includes an output port 1204C for transmitting light that is emitted by the lamps, and a specularly back or bottom reflector 1212 on the back or bottom side of the cavity facing output port 1204C.

Optical stack 1290 includes a substantially forward scattering optical diffuser 1220 disposed at output port 1204C, a first optical adhesive layer 1230 disposed on the optical diffuser, an optical film 1240 disposed on the first optical adhesive layer, a reflective polarizer layer 1250 disposed on the optical film, a second optical adhesive layer 1235 disposed on the reflective polarizer layer, and a substrate 1260 disposed on the second optical adhesive layer. Optical film 1240 is disposed between reflective polarizer layer 1250 and the substantially forward scattering optical diffuser layer 1220.

Optical film 1240 has a sufficiently low refractive index and low optical haze and is sufficiently thick so as to promote or enhance total internal reflection at interface 1242 between optical film 1240 and first optical adhesive layer 1230. The index of refraction of the optical film is not greater than about 1.3, or not greater than about 1.25, or not greater than about 1.2, or not greater than about 1.15, or not greater than about 1.1, or not greater than about 1.05. The thickness of the optical film is not less than about 0.7 microns, or not less than about 0.8 microns, or not less than about 0.9 microns, or not less than about 1 micron, or not less than about 1.1 microns, or not less than about 1.2 microns, or not less than about 1.3 microns, or not less than about 1.4 microns, or not less than about 1.5 microns, or not less than about 1.7 microns, or not less than about 2 microns. The optical haze of the optical film is not greater than about 5%, or not greater than about 4%, or not greater than about 3%, or not greater than about 2%, or not greater than about 1%, or not greater than about 0.5%.

For light normally incident on optical film 1240, optical haze, as used herein, is defined as the ratio of the transmitted light that deviates from the normal (y-) direction by more than 4 degrees to the total transmitted light. Haze values disclosed herein were measured using a Haze-Gard Plus haze meter (BYK-Gardiner, Silver Springs, Md.) according to the procedure described in ASTM D1003.

Optical film 1240 has a high optical clarity. For light normally incident on optical film 120, optical clarity, as used herein, refers to the ratio $(T_2-T_1)/(T_2+T_1)$, where $T_1$ is the transmitted light that deviates from the normal direction between 1.6 and 2 degrees, and $T_2$ is the transmitted light that lies between zero and 0.7 degrees from the normal direction. Clarity values disclosed herein were measured using a Haze-Gard Plus haze meter from BYK-Gardiner. In the cases where optical film 1240 has a high optical clarity, the clarity is not less than about 50%, or not less than about 60%, or not less than about 70%, or not less than about 80%, or not less than about 90%, or not less than about 95%.

Optical film 1240 includes a plurality of voids, such as interconnected voids, dispersed in a binder. The binder can be or include any material that may be desirable in an application. For example, the binder can be a UV curable material that forms a polymer, such as a cross-linked polymer. In general, the binder can be any polymerizable material, such as a polymerizable material that is radiation-curable.

In some cases, optical film 1240 also includes a plurality of particles dispersed in the binder and/or the optical film. The particles can be any type particles that may be desirable in an application. For example, the particles in optical film 1240 can be organic or inorganic particles. For example, the particles can be silica, zirconium oxide or alumina particles. The particles in optical film 1240 can have any shape that may be desirable or available in an application. For example, the particles can have a regular or irregular shape. For example, the particles can be approximately spherical. As another example, the particles can be elongated. In such cases, optical film 1240 includes a plurality of elongated particles. In some cases, the elongated particles have an average aspect ratio that is not less than about 1.5, or not less than about 2, or not less than about 2.5, or not less than about 3, or not less than about 3.5, or not less than about 4, or not less than about 4.5, or not less than about 5. In some cases, the particles in optical film 1240 can be in the form or shape of a string-of-pearls (such as Snowtex-PS particles available from Nissan Chemical, Houston, Tex.) or aggregated chains of spherical or amorphous particles, such as fumed silica.

The particles in optical film 1240 may or may not be functionalized. In some cases, the particles are not functionalized. In some cases, the particles are functionalized so that they can be dispersed in a desired solvent or binder with no, or very little, clumping. In some cases, the particles can be further functionalized to chemically bond to the host binder. For example, the particles can be surface modified and have reactive functionalities or groups to chemically bond to the binder. In some cases, some of the particles in optical film 1240 have reactive groups and others do not have reactive groups. For example in some cases, about 10% of the particles have reactive groups and about 90% of the particles do not have reactive groups, or about 15% of the particles have reactive groups and about 85% of the particles do not have reactive groups, or about 20% of the particles have reactive groups and about 80% of the particles do not have reactive groups, or about 25% of the particles have reactive groups and about 75% of the particles do not have reactive groups, or about 30% of the particles have reactive groups and about 60% of the particles do not have reactive groups, or about 35% of the particles have reactive groups and about 65% of the particles do not have reactive groups, or about 40% of the particles have reactive groups and about 60% of the particles do not have reactive groups, or about 45% of the particles have reactive groups and about 55% of the particles do not have reactive groups, or about 50% of the particles have reactive groups and about 50% of the particles do not have reactive groups. In some cases, some of the particles can be functionalized with both reactive and non-reactive groups. For example, in some cases, a substantial fraction of the particles, such as at least about 30%, or at least about 40%, or at least about 50%, or at least about 60%, or at least about 70%, or at least about 80%, of the particles can be functionalized with both reactive and non-reactive groups.

In some cases, the particles can have an average diameter of greater than about 0.5 microns, or greater than about 1 micron, or greater than about 1.5 microns, or greater than about 2 microns. In some cases, the particles can have an average diameter that is less than about 1 micron, or less than about 0.7 microns, or less than about 0.5 microns, or less than about 0.3 microns, or less than about 0.2 microns, or less than about 0.1 microns, or less than about 0.07 microns, or less than about 0.05 microns. In some cases, the optical film can have a first plurality of larger particles that have an average diameter that is not less than about 1 micron and a second plurality of smaller particles that have an average diameter that is not greater than about 0.5 microns. In such cases, the particle size distribution can have a first peak located at less than about 0.5 microns and a second peak located at greater than about 1 micron.

Optical film 1240 can be any optical film that includes a plurality of voids. For example, optical film 1240 can be an optical film described in U.S. Patent Application Ser. No. 61/169,466 titled "Optical Film", filed on Apr. 15, 2009, and U.S. Patent Application Ser. No. 61/169,521 "Optical Construction and Display System Incorporating Same" filed on Apr. 15, 2009. As another example, optical film 1240 can be an optical film described in U.S. Patent Application Ser. No. 61/254,676 titled "Voided Diffuser", and U.S. Patent Application Ser. No. 61/254,243 "Optical Construction and Method of Making the Same", the disclosures of which are incorporated herein in their entireties by reference.

Optical diffuser 1220 is a substantially forward scattering diffuser meaning that a substantial portion, such as at least about 20%, or at least about 30%, or at least about 40%, or at least about 50%, or at least about 60%, or at least about 70%, or at least about 80%, of light incident on the optical diffuser is scattered in a forward direction as forward scattered reflected and/or transmitted lights.

Figure 2:
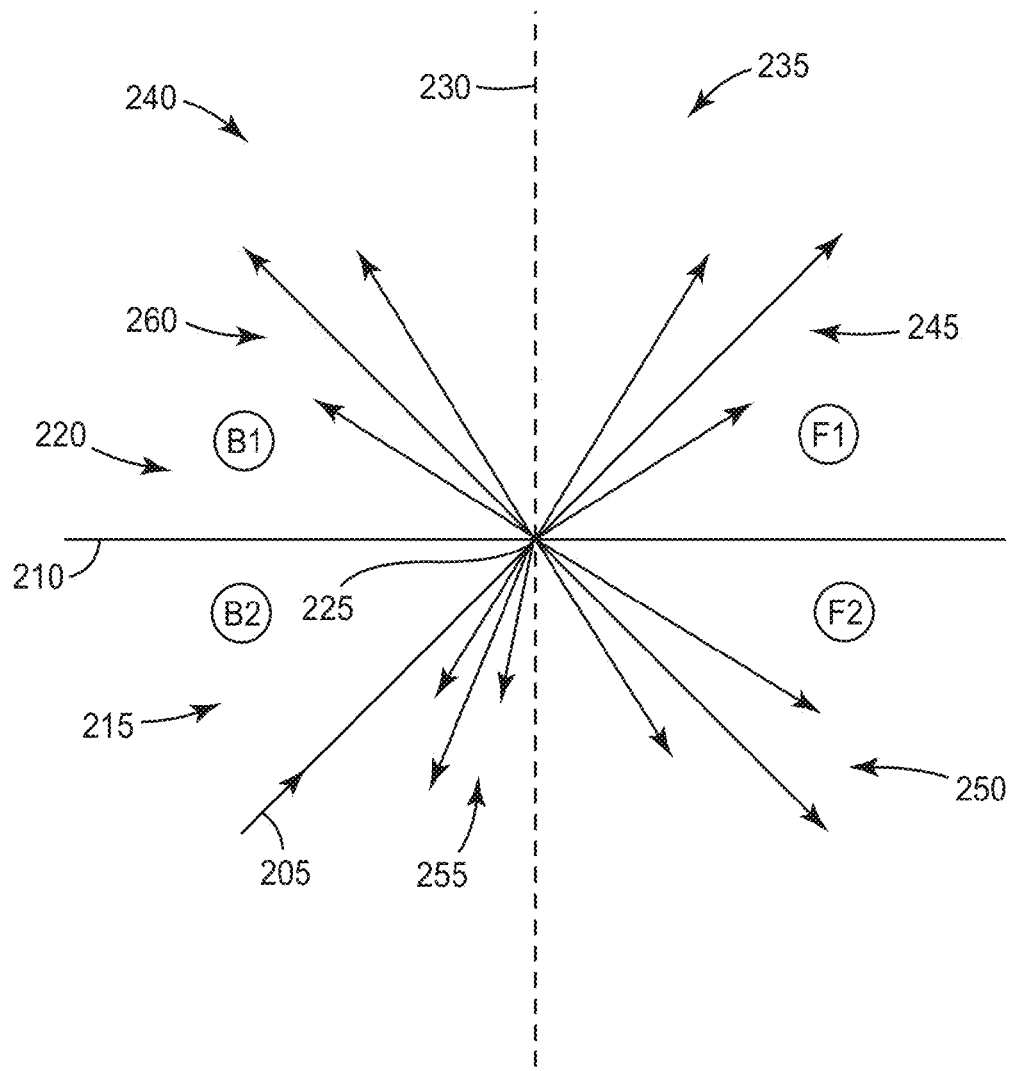
FIG. 2 is a schematic illustration of forward and backward scattering.

FIG. 2 is a schematic illustration of a light ray 205 that is incident at an incident point 225 on an interface 210 between a first medium 215 and a different second medium 220. Incident point 225 defines a normal plane 230 that is normal to interface 210 at incident point 225. Plane 230 divides the space into a forward section 235 and a backward section 240. Portions of incident light 205 that are scattered in a forward direction lie and propagate in forward section 235 and portions of incident light 205 that are scattered in backward direction lie and propagate in backward section 240. For example, light ray 205 is scattered at interface 210 resulting in a forward scattered transmitted light 245 having a flux F1, a forward scattered reflected light 250 having a flux F2, a backward scattered transmitted light 260 having a flux B1, and a backward scattered reflected light 255 having a flux B2. The total light scattered in the forward direction has a flux F=F1+F2 and the total light scattered in the backward direction has a flux B=B1+B2. The degree of forward scattering of incident light ray 205 by interface 210 can be characterized by a "transport ratio" TR, defined as:

$$TR=(F-B)/(F+B) \qquad (4)$$

where TR can, in general, have a value in a range from zero to one. For example, in the case of a specular reflector, F1, B1 and B2 are zero resulting in a transport ratio of one. As another example, in the case of a Lambertian reflector, F1 and B1 are zero, and F2=B2 resulting in a transport ratio of zero.

Referring back to FIG. 1, in some cases, such as when optical diffuser layer 1220 is a substantially forward scattering optical diffuser, the optical diffuser layer has a transport ratio that is not less than about 0.2, or not less than about 0.3, or not less than about 0.4, or not less than about 0.5, or not less than about 0.6, or not less than about 0.8.

Optical diffuser layer 1220 transmits a portion of an incident light and reflects another portion of the incident light. In some cases, the optical reflectance of optical diffuser layer 1220 is at least 40%, or at least 50%, or at least 60%, or at least 70%, or at least 80%, or at least 90%. In some cases, the optical transmittance of optical diffuser layer 1220 is not greater than about 30%, or not greater than about 25%, or not greater than about 20%, or not greater than about 15%, or not greater than about 10%. In some cases, such as when light source 100 provides uniform illumination, the optical haze of substantially forward scattering optical diffuser layer 1220 is not less than about 20%, or not less than about 30%, or not less than about 40%, or not less than about 50%, or not less than about 60%, or not less than about 70%.

Optical diffuser layer 1220 can be any optical diffuser that is a substantially forward scattering optical diffuser. For example, in some cases, optical diffuser layer 1220 can be a semi-specular partial reflector that reflects a portion of an incident light and transmits another portion of the incident light, where each of the transmitted and reflected portions includes a specular portion and a diffuse portion. In such cases, a portion of light reflected by layer 1220 is specularly reflected and another portion of light reflected by layer 1220 is diffusely reflected. Similarly, in such cases, a portion of light transmitted by layer 1220 is specularly transmitted and another portion of light transmitted by layer 1220 is diffusely transmitted. In some cases, substantially forward scattering optical diffuser layer 1220 can be or include a substantially forward scattering surface diffuser or a substantially forward scattering volume diffuser or a substantially forward scattering diffuser that is a combination of a surface diffuser and a volume diffuser. In the exemplary display system 1200, optical diffuser layer 1220 includes a scattering layer 1224 disposed on an optically clear substrate 1222.

Light incident on optical diffuser 1220 is scattered substantially in forward directions. For example, a light ray 1270 incident on the optical diffuser is substantially scattered in the forward direction as a first transmitted light ray 1274 and a first reflected light ray 1272. Light ray 1274 is subsequently totally internally reflected at interface 1242 as second reflected light ray 1276 which is substantially scattered by scattering layer 1224 in a forward direction as a second transmitted light ray 1278 propagating inside the optical cavity. A substantially forward scattering optical diffuser layer 1220 can provide efficient mixing of light emitted by lamps 1201 and 1202 resulting in light source 100 uniformly illuminating liquid crystal panel 1280. In some cases, lamps 1201 and 1202 are more optically absorptive than other components, such as, for example, the various specular reflectors, in the optical cavity. In such cases, a substantially forward light scattering optical diffuser 1220 scatters light that is emitted by the lamps substantially in the forward directions and away from the lamps, which can result in light source 100 emitting brighter light.

In some cases and specially for light rays propagating at large angles relative to the y-direction, some of the layers disposed on top of optical film 1240, such as reflective polarizer layer 1250, substrate 1260, and/or a liquid crystal panel 1280 that includes one or more light absorbing polarizers, can be more optically absorptive than optical film 1240. In such cases, optical film 1240 is advantageously positioned in between the more light absorbing layers and optical cavity 1215 to prevent or reduce optical loss by totally internally reflecting light that would otherwise be absorbed in the layers above the optical film.

In some cases, optical diffuser 1220 is sufficiently optically diffusive so as to substantially hide at least some detailed features and/or components, such as lamps 1201 and 1202, in optically reflective cavity 1215 from a viewer 1295 that views display system 1200 from above liquid crystal panel 1280, specially from larger viewing angles. In some cases, optical diffuser 1220 is sufficiently optically diffusive so as to eliminate or substantially reduce the hall of mirrors effect that can occur and be visible to viewer 1295 when, for example, multiple specular reflections between specular reflectors 1210A-1210D and 1212 create a repeating image pattern. In some cases, optical diffuser 1220 is sufficiently optically diffusive to assist in homogenizing light within optical cavity 1215 so that light with a substantially uniform intensity can be delivered to liquid crystal panel 1280.

In the exemplary display system 1200, optical diffuser 1220 is a surface diffuser meaning that a thin scattering layer 1224 is disposed on an optically clear non-diffusive substrate 1222. The scattering layer can, for example, be a plurality of beads disposed on substrate 1222, where the beads can, for example, be dispersed in a host binder. As another example, scattering layer 1224 can be a surface structure formed in the bottom surface of substrate 1222. In some cases, optical diffuser 1220 can be a substantially forward scattering volume diffuser. In general, optical diffuser 1220 can be any type optical diffuser or scatterer that is substantially forward scattering.

In some cases, side light reflectors 1210A-1210D and back reflector 1212 are substantially specular reflectors. For example, in such cases, the ratio of the specular reflectance to diffuse reflectance of a substantially specular reflector is at least about 100, or at least about 200, or at least about 300, or at least about 400, or at least about 500. In such cases, the diffuse reflectance of the substantially specular reflector is not more than about 2%, or not more than about 1.5%, or not more than about 1%, or not more than about 0.5%.

In some cases, at least one of side light reflectors 1210A-1210D and back reflector back reflector 1212 can be a semi-specular reflector meaning that a portion of an incident light is specularly reflected and another portion of the incident light is diffusely reflected. In such cases, the diffusely reflected portion is scattered substantially in the forward direction. For example, in some cases, back reflector 1212 can be a semi-specular reflector. As another example, in some cases, one or more of side reflectors 1210A-1210D can be a semi-specular light reflectors.

Specular reflectors 1210A-1210D and 1212 can be any type specular reflectors that may be desirable and/or practical in an application. For example, the reflectors can be aluminized films, silver coated films, or multilayer polymeric reflective films, such as enhanced specular reflector (ESR) films available from 3M Company, St. Paul, Minn. The ESR films have a reflectance of at least about 99% in the wavelength range from about 400 nm to about 1000 nm at normal incidence.

Reflective polarizer layer 1250 substantially reflects light that has a first polarization state and substantially transmits light that has a second polarization state, where the two polarization states are mutually orthogonal. In some cases, reflective polarizer 1250 substantially reflects light having a first linear polarization state (for example, along the x-direction) and substantially transmits light having a second linear polarization state (for example, along the z-direction).

Any suitable type of reflective polarizer may be used for reflective polarizer layer 1250 such as, for example, a multilayer optical film (MOF) reflective polarizer, a diffusely reflective polarizing film (DRPF), a wire grid reflective polarizer, or a cholesteric reflective polarizer. In some cases, reflective polarizer layer 1250 can be or include a fiber polarizer. In such cases, the reflective polarizer includes a plurality of substantially parallel fibers that form one or more layers of fibers embedded within a binder with at least one of the binder and the fibers including a birefringent material. The substantially parallel fibers define a transmission axis and a reflection axis. The fiber polarizer substantially transmits incident light that is polarized parallel to the transmission axis and substantially reflects incident light that is polarized parallel to the reflection axis. Examples of fiber polarizers are described in, for example, U.S. Pat. Nos. 7,599,592 and 7,526,164, the entireties of which are incorporated herein by reference.

In some cases, reflective polarizer layer 1250 can be a partially reflecting layer that has an intermediate on-axis average reflectance in the pass state. For example, the partially reflecting layer can have an on-axis average reflectance of at least about 90% for visible light polarized in a first plane, such as the xy-plane, and an on-axis average reflectance in a range from about 25% to about 90% for visible light polarized in a second plane, such as the xz-plane, perpendicular to the first plane.

In some cases, reflective polarizer layer 1250 can be an extended band reflective polarizer that is capable of polarizing light at smaller incident angles and substantially reflecting one polarization state, or two mutually perpendicular polarization states, at larger incident angles as described in U.S. Patent Application Ser. No. 61/254,691 titled "Immersed Reflective Polarizer with High Off-Axis Reflectivity", and U.S. Patent Application Ser. No. 61/254,692 "Immersed Reflective Polarizer With Angular Confinement in Selected Planes of Incidence", both filed on even date herewith and the disclosures of which are incorporated herein in their entireties by reference.

In some cases, reflective polarizer layer 1250 can be a diffuse reflective polarizer substantially transmitting one polarization state and substantially diffusely reflecting an orthogonal polarization state. Diffuse reflective polarizer films typically include a disperse phase of polymeric particles disposed within a continuous birefringent matrix. The film is oriented, typically by stretching, in one or more directions to develop the birefrengence. Examples of diffuse reflective polarizers are described in, for example, U.S. Pat. Nos. 6,999,233 and 6,987,612 the disclosures of which are incorporated herein by reference.

Substrate 1260 is optically transparent and is primarily designed to provide support to and strengthen optical stack 1290. Substrate 1260 can be rigid or flexible. Exemplary materials for the substrate include glass and polymers such as polyethylene terapthalate (PET), polycarbonates, and acrylics.

In some cases, first and second optical adhesive layers 1230 and 1235 are primarily designed to bond the layer on one side of the adhesives to the layer on the other side of the adhesives. In such cases, the primary purpose of first optical adhesive layer 1230 is to laminate optical film 1240 to substantially forward scattering optical diffuser layer 1220 and the primary purpose of second optical adhesive layer 1235 is to laminate reflective polarizer layer 1250 to support substrate 1260. In such cases, the optical adhesive layers can have a high specular optical transmittance. For example, in such cases, the specular optical transmittance of each of the adhesive layers is not less than about 60%, or not less than about 70%, or not less than about 80%, or not less than about 90%.

In some cases, one or both of adhesive layers 1230 and 1235 may be absent in display system 1200. For example, in some cases, display system 1200 may not include first optical adhesive layer 1230. In such cases, optically diffuser layer 1220 can be coated directly on optical film 1240. In some cases, optical film 1240 is coated on reflective polarizer layer 1250. In some cases, optical film 1240 is laminated to reflective polarizer layer 1250 via an adhesive layer not shown expressly in FIG. 1.

In some cases, optical adhesive layers 1230 and/or 1235 can be optically diffusive. For example, in such cases, the optical haze of an optically diffusive adhesive layer can be at least about 5%, or at least about 10%, or at least about 15%, or at least about 20%. In some cases, the diffuse reflectance of an optically diffusive adhesive layer can be at least about 5%, or at least about 10%, or at least about 15%, or at least about 20%. In such cases, the adhesive layer can be optically diffusive by, for example, including a plurality of particles dispersed in an optical adhesive binder where the particles and the optical adhesive binder have different indices of refraction. The mismatch between the two indices of refraction can result in light scattering.

Optical adhesive layers 1230 and 1235 can be or include any optical adhesive that may be desirable and/or available in an application. Exemplary optical adhesives include pressure sensitive adhesives (PSAs), heat-sensitive adhesives, solvent-volatile adhesives, and UV-curable adhesives such as UV-curable optical adhesives available from Norland Products, Inc. Exemplary PSAs include those based on natural rubbers, synthetic rubbers, styrene block copolymers, (meth)acrylic block copolymers, polyvinyl ethers, polyolefins, and poly (meth)acrylates. As used herein, (meth)acrylic (or acrylate) refers to both acrylic and methacrylic species. Other exemplary PSAs include (meth)acrylates, rubbers, thermoplastic elastomers, silicones, urethanes, and combinations thereof. In some cases, the PSA is based on a (meth)acrylic PSA or at least one poly(meth)acrylate. Exemplary silicone PSAs include a polymer or gum and an optional tackifying resin. Other exemplary silicone PSAs include a polydiorganosiloxane polyoxamide and an optional tackifier.

In some cases, one or both of optical adhesive layers 1230 and 1235 can be a removable adhesive such as those described in, for example, U.S. Pat. Nos. 3,691,140; 4,166,152; 4,968,562; 4,994,322; 5,296,277; 5,362,516, the disclosures of which are incorporated herein in their entireties by reference. The phrase "removable adhesive" for adhering a film to a substrate means an adhesive that affords convenient, manual removal of the film from the substrate without damaging the substrate or exhibiting excessive adhesive transfer from the film to the substrate.

In some cases, one or both of optical adhesive layers 1230 and 1235 can be a reusable and/or repositionable adhesive such as those described in, for example, U.S. Pat. No. 6,197, 397; U.S. Patent Publication No. 2007/0000606; and PCT Publication No. WO 00/56556, the disclosures of which are incorporated herein in their entireties by reference. The phrases "reusable adhesive" or "repositionable adhesive" for adhering a film to a substrate mean an adhesive that (a) affords a temporary, secure attachment of the film to the substrate while affording convenient, manual removal of the film from the substrate without damaging the substrate or exhibiting excessive adhesive transfer from the film to the substrate, and (b) then affords subsequent reuse of the film on, for example, another substrate.

Substantial portions of each two neighboring major surfaces in optical stack 1290 are in physical contact with each other. For example, substantial portions of neighboring major surfaces 1241 and 1251 of respective neighboring layers 1240 and 1250 in optical stack 1290 are in physical contact with each other. For example, at least 50%, or at least 60%, or at least 70%, or at least 80%, or at least 90%, or at least 95% of the two neighboring major surfaces are in physical contact with each other. For example, in some cases, optical film 1240 is coated directly on reflective polarizer layer 1250.

In general, substantial portions of neighboring major surfaces (major surfaces that face each other or are adjacent to each other) of each two neighboring layers in optical stack 1290 are in physical contact with each other. For example, in some cases, there may be one or more additional layers, such as a support layer or an adhesive layer, disposed between reflective polarizer layer 1250 and optical film 1240. In such cases, substantial portions of neighboring major surfaces of each two neighboring layers in optical stack 1290 are in physical contact with each other. In such cases, at least 50%, or at least 60%, or at least 70%, or at least 80%, or at least 90%, or at least 95% of the neighboring major surfaces of each two neighboring layers in the optical stack are in physical contact with each other.

Figure 4:
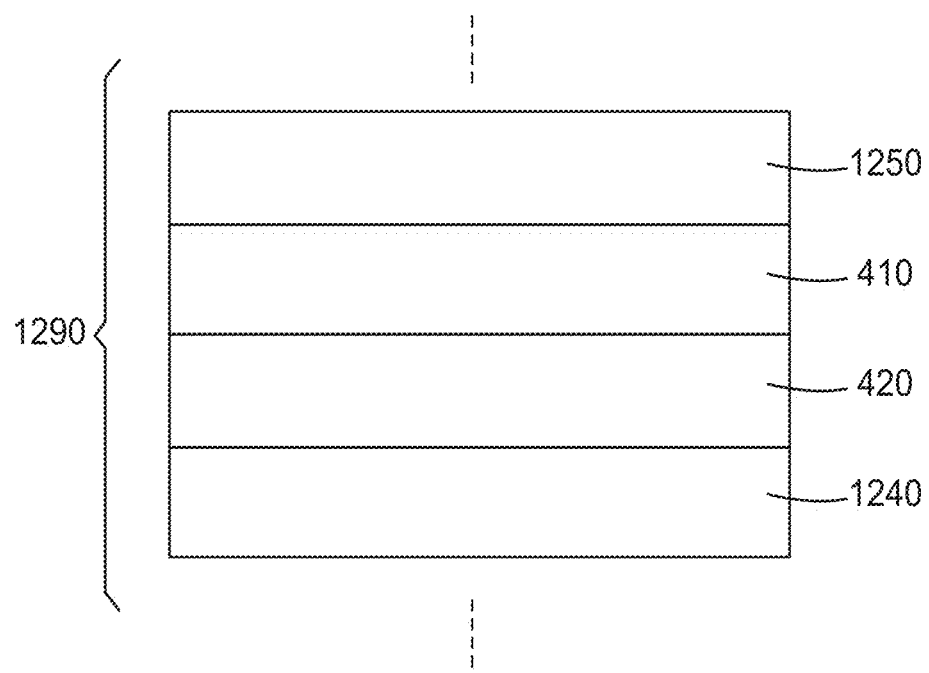
FIG. 4 is a schematic side-view of an optical stack.

In the exemplary optical stack 1290, optical film 1240 physically contacts reflective polarizer layer 1250. For example, optical film 1240 can be coated directly on bottom surface 1251 of reflective polarizer layer 1250. In some cases, one or more layers can be disposed between the two layers. For example, FIG. 4 is a schematic side-view of an optical stack 1290 that includes an optical adhesive layer 410 and a substrate layer 420 disposed between optical film 1240 and reflective polarizer layer 1250 where substrate layer 420 can be a support layer for optical film 1240 and optical adhesive layer can be a bonding layer for bonding or laminating the optical film to the reflective polarizer layer.

Referring back to FIG. 1, liquid crystal panel 1280 includes, not expressly shown in FIG. 1, a layer of liquid crystal disposed between two panel plates, an upper light absorbing polarizer layer disposed above the liquid crystal layer and a lower absorbing polarizer disposed below the liquid crystal layer. The upper and lower light absorbing polarizers and the liquid crystal layer, in combination, control the transmission of light from reflective polarizer layer 1250 through liquid crystal panel 1280 to viewer 1295.

Lamps 1201 and 1202 can be any type of lamp that may be desirable and/or practical in an application. For example, the lamps can be extended diffuse lamps such as cold cathode fluorescent lamps (CCFLs), smaller area solid state lamps such as light emitting diodes (LEDs), or lasers. In some cases, one or more of lamps 1201 and 1202 can include different type lamps. For example, lamps 1201 can include a combination of LEDs and CCFLs. In some cases, the lamps can emit light in different wavelength regions. For example, lamps 1201 can include a first lamp emitting red light, a second lamp emitting green light, and a third lamp emitting blue light.

Figure 3:
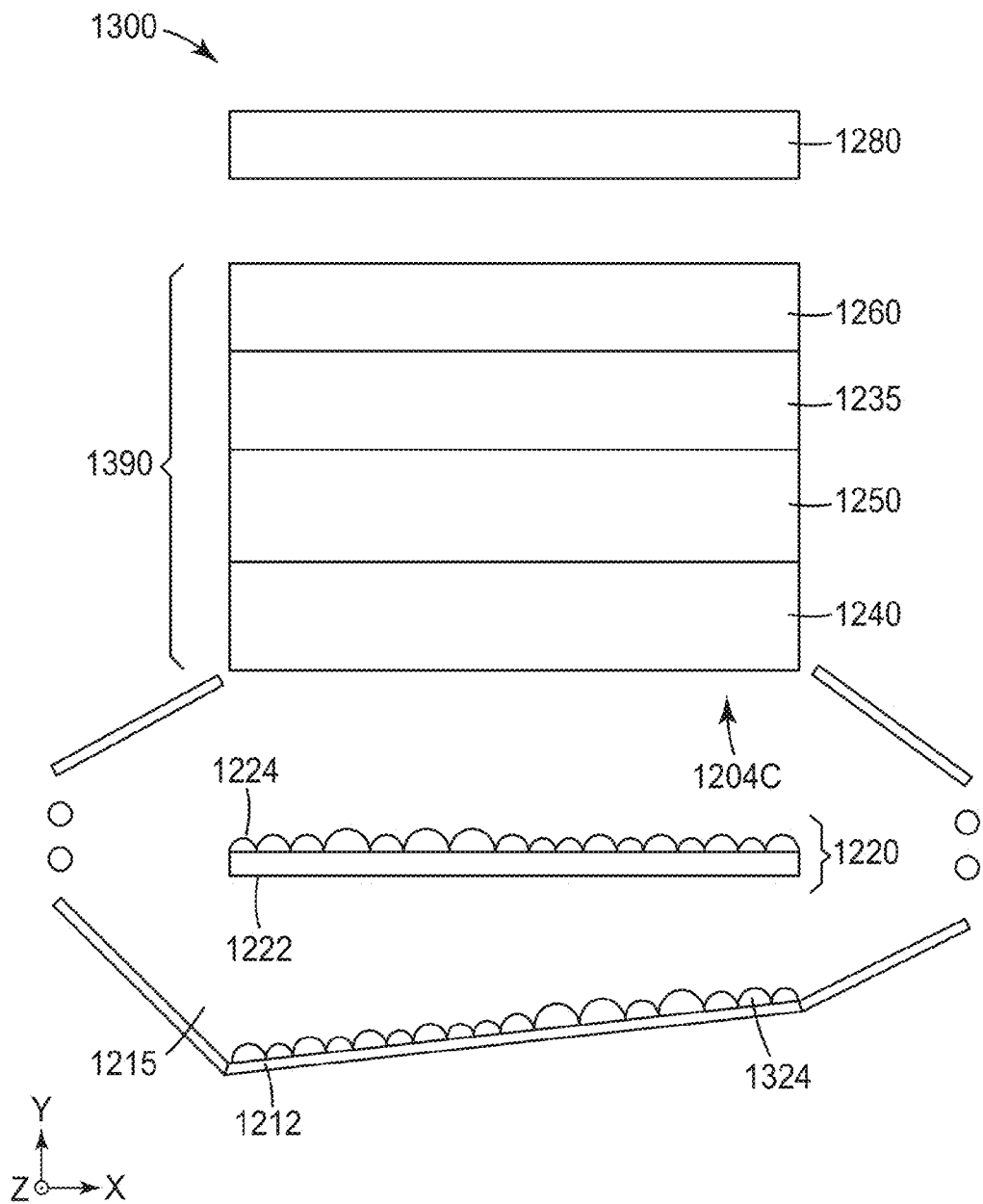
FIG. 3 is a schematic side-view of another display system.

In the exemplary display system 1200, substantially forward scattering optical diffuser layer 1220 is placed at output port 1204C of optically reflective cavity 1215. In some cases, such as when the primary function of the diffuser layer is to assist in mixing and homogenizing light inside optical cavity 1215, diffuser layer 1220 can be placed, with proper orientation, at other locations within the optical cavity. For example, FIG. 3 is a schematic side-view of a display system 1300 that is similar to display system 1200 except that optical diffuser layer 1220 in display system 1300 is placed within the interior of optical cavity 1215 in the xz-plane so that the forward scattering properties of the optical diffuser can assist in efficient mixing of light emitted by the lamps. As another example, optical diffuser 1220 and/or scattering layer 1224 can be disposed on one or more reflectors in the optical cavity. For example, FIG. 3 illustrates a scattering layer 1324, similar to scattering layer 1224, disposed on back reflector 1212. In the exemplary display system 1300, optical film 1240 is placed at output port 1204C of optical cavity 1215.

Low index properties of optical film 1240 and the substantially forward scattering properties of optical diffuser layer 1220 can advantageously provide for a compact and thin optically reflective cavity 1215 and improved light mixing. For example, in some cases, the maximum lateral dimension, such as the size of the diagonal or length of optically reflective cavity 1215 is substantially greater than the maximum thickness of the reflective cavity. For example, in such cases, the ratio of the maximum lateral (in the xz-plane) dimension of optically reflective cavity 1215 to the maximum thickness (along the y-direction) of the optically reflective cavity is not less than about 20, or not less than about 40, or not less than about 60, or not less than about 80, or not less than about 100. In some cases, the maximum thickness hi of optically reflective cavity 1215 in FIG. 1 is in a range from about 2 mm to about 50 mm, or from about 5 mm to about 40 mm, or from about 7 mm to about 30 mm, or from about 10 mm to about 20 mm.

In some cases, a display system, such as an LCD system, can incorporate a backlight for uniform illumination of a liquid crystal panel where the backlight includes light source 100 with no additional layers. In some cases, the backlight can include light source 100 and one or more additional layers, such as one or more additional light management layers or films. Examples of light management films include reflective polarizers, light redirecting films such as a brightness enhancement films (for example, BEF available from 3M Company, Saint Paul Minn.), turning films (for example, an inverted BEF), optical diffusers, or any other light management layer that may be desirable in an application.

In the exemplary display system 1200, layer 1250 is a reflective polarizer. In some cases, layer 1250 can be a non-polarizing partially reflective partially transmissive layer transmitting a portion of an incident light as an unpolarized transmitted light and reflecting a portion, such as least 30% or at least 40% or at least 50%, of the incident light as an unpolarized reflected light. In some cases, a non-polarizing partially reflective partially transmissive layer can also absorb a portion of the incident light. The partially reflective partially transmissive layer can be a multilayer optical film, or a metal, such as Al or Ag or Ni, coated film. In some cases, a non-polarizing partially reflective partially transmissive layer can be or include foams or microreplictated structures.

Figure 12:
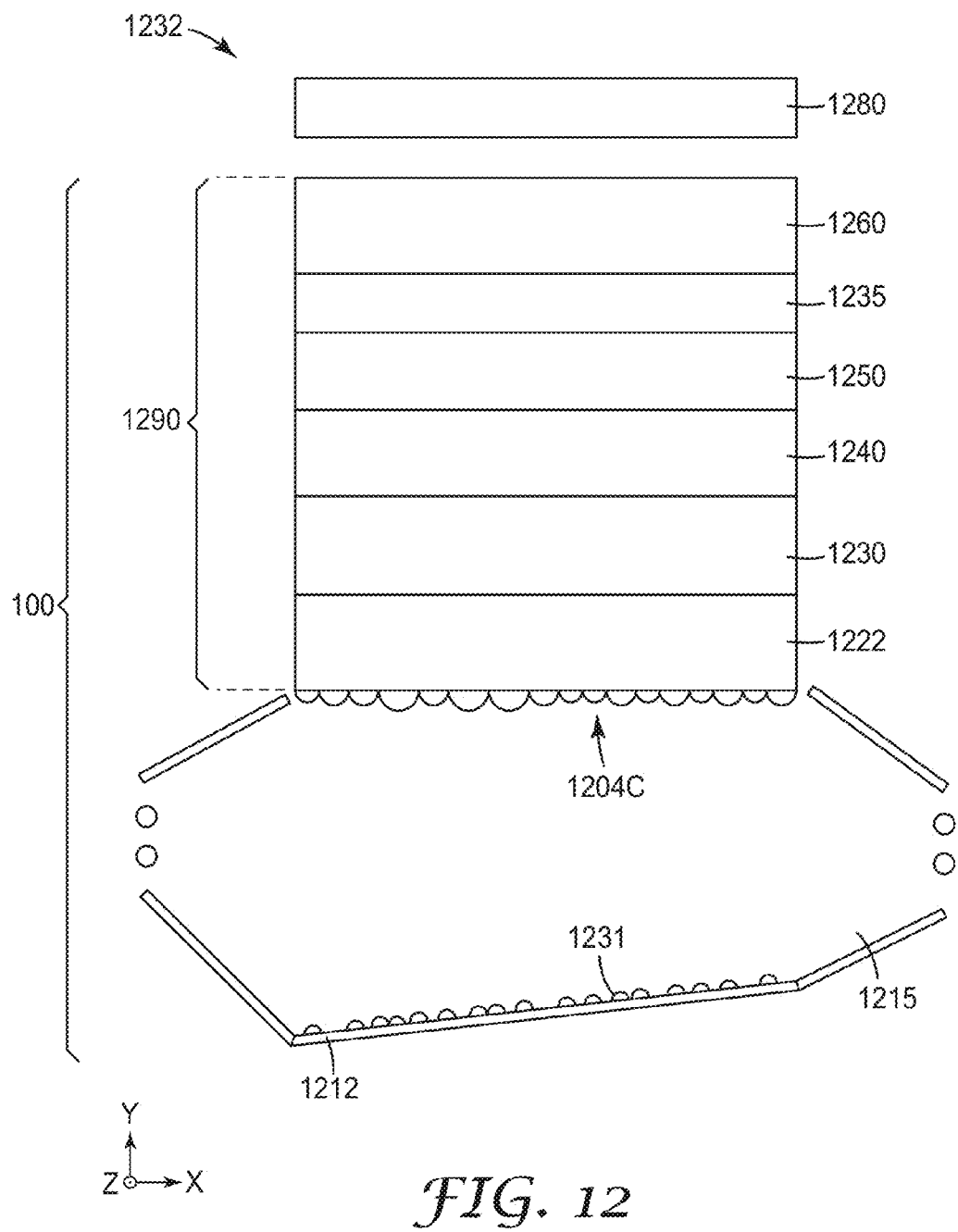
FIG. 12 is a schematic side-view of a display system.

In some cases, optically reflective hollow cavity 1215 can include extraction features to assist in extracting light from the cavity. For example, FIG. 12 is a schematic side-view of a display system 1232 that is similar to display system 1200 except that optically reflective cavity 1215 in FIG. 12 includes a plurality of extraction features 1231 disposed on back reflector 1212. Extraction features 1231 assist in extracting light from the reflective cavity from output port 1204C. Extraction features 1231 can be any extraction features capable of extracting or assisting in extracting light from the cavity. For example, the extraction features can be features that are for example, printed, cast or stamped, on the back reflector. In some cases, extraction features 1231 can be arranged to enhance or increase the brightness along a desired, such as the on-axis, direction.

Figure 18:
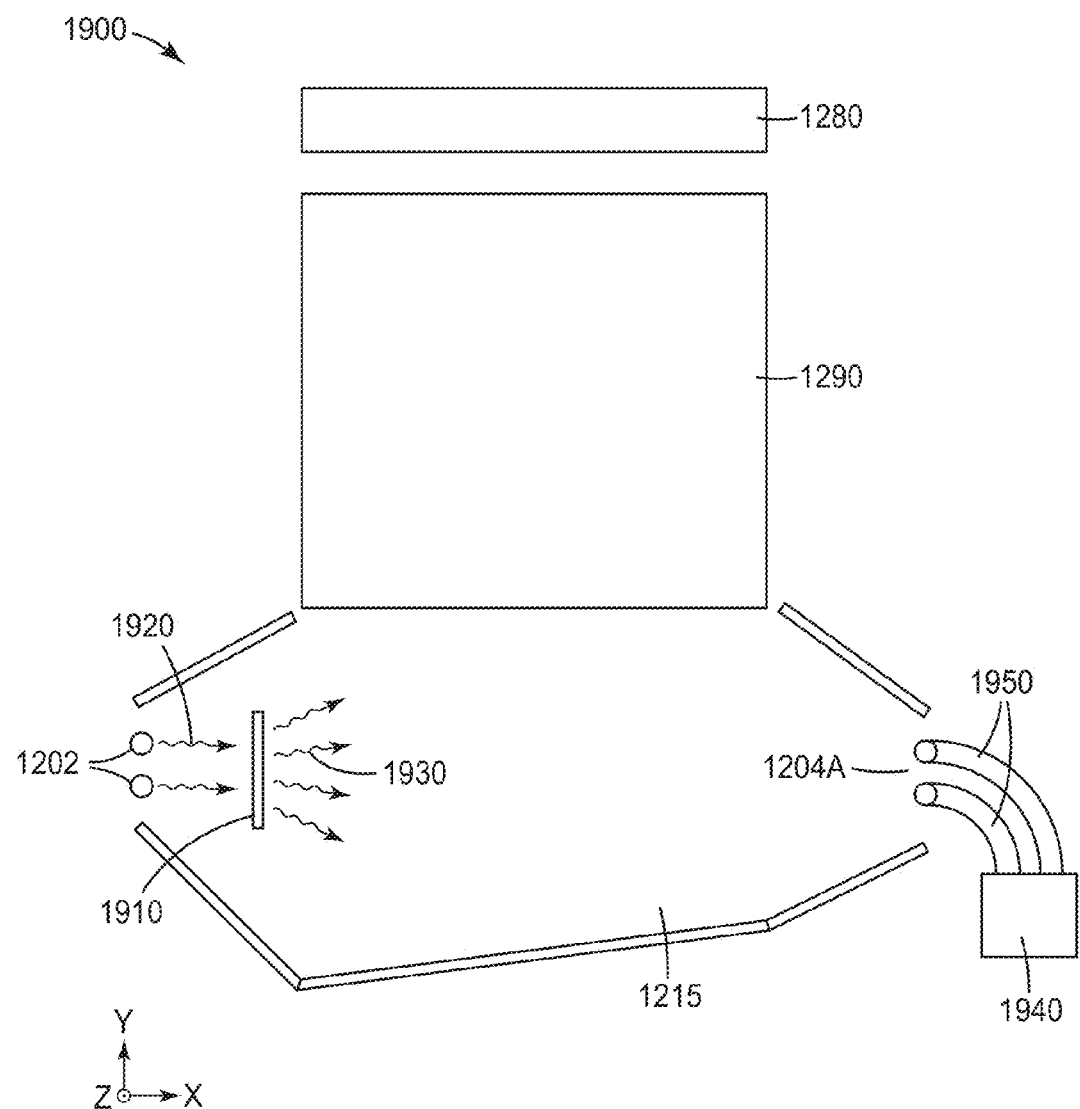
FIG. 18 is a schematic side-view of another display system.

Optically reflective cavity 1215 can include one or more optical elements not expressly shown in FIG. 1. For example, FIG. 18 is a schematic side-view of a display system 1900, where optically reflective hollow cavity 1215 includes an optical element 1910 receiving light 1920 emitted by lamps 1202. Optical element 1910 can be or include an optical filter reflecting and/or absorbing a portion, such as a UV portion, of incident light 1920. As another example, optical element 1910 can be or include an asymmetric, such as a one-dimensional, optical diffuser for spreading emitted light 1920 more along a particular direction, such as the z-direction, and less along other directions. As another example, optical element 1910 can be or include a wavelength converter for converting, such as down converting, light 1920 to a different, such as longer, wavelength light 1930. As yet another example, optical element 1910 can be or include a light collimator receiving a less collimated light 1920 and transmitting a more collimated light 1930.

In some cases, light emitted by a lamp in optically reflective cavity 1215 can be delivered to the optical cavity via one or more hollow or solid light guides, such as for example, one or more optical fibers. For example, in FIG. 18, light from a lamp 1940 is delivered to optically reflective cavity 1215 at input port 1204A via optical fibers 1950.

In the exemplary display system 1200 in FIG. 1, reflective polarizer 1250 and back reflector 1212 are planar and non-parallel relative to each other. In general, the orientation of the reflective polarizer layer and the back reflector relative to each other can be any orientation that may be desirable in an application. For example, in some cases, the reflective polarizer layer can be parallel to the back reflector. In some cases, the reflective polarizer layer can be non-parallel to the back reflector. In some cases, one or both of the two layers can be planar or non-planar, such as curved.

Figure 19:
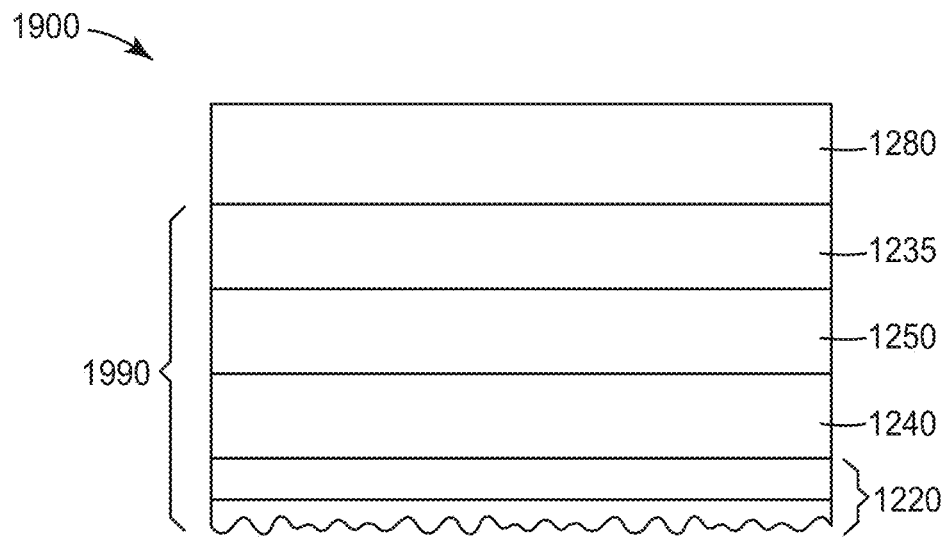
FIG. 19 is a schematic side-view of an optical construction.

In some cases, optical stack 1290 can be bonded to liquid crystal panel and can have fewer layers. For example, FIG. 19 is a schematic side-view of an optical construction 1900 that includes liquid crystal panel 1280 disposed on an optical stack 1990. Optical stack 1990 can, in some cases, replace optical stack 1290 in FIG. 1 and is laminated or bonded to liquid crystal panel 1280 via optical adhesive layer 1235. Optical stack 1990 includes optical diffuser layer 1220 disposed at output port 1204C, optical film 1240 disposed on the optical diffuser layer, reflective polarizer layer 1250 disposed on the optical film, and optical adhesive layer 1235 disposed on the reflective polarizer layer. In some cases, there can be one or more layers between any two neighboring layers in optical stack 1990 or optical construction 1900.

Figure 20:
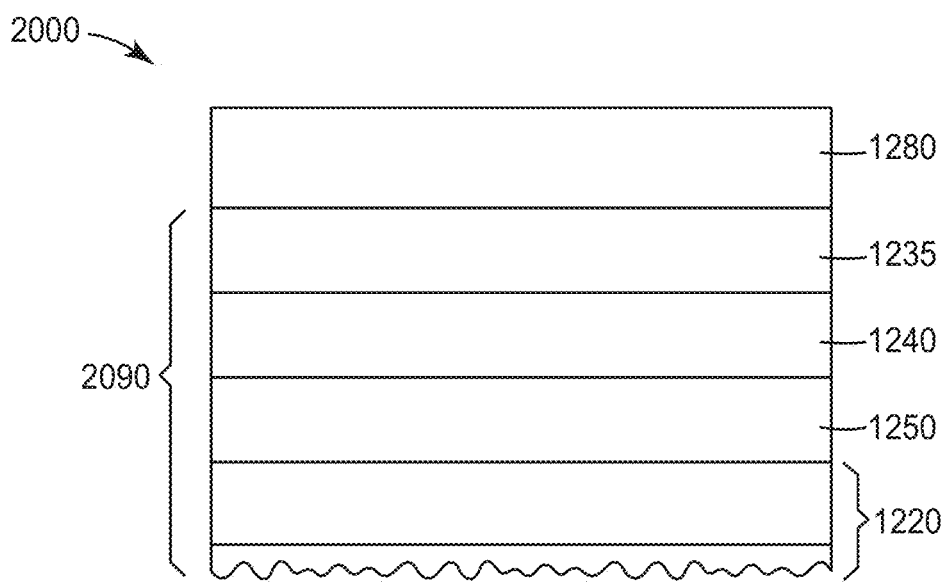
FIG. 20 is a schematic side-view of another optical construction.

In some cases, a disclosed optical stack can include an optical film disposed between a liquid crystal panel and a reflective polarizer layer. For example, FIG. 20 is a schematic side-view of an optical construction 2000 that includes liquid crystal panel 1280 disposed on an optical stack 2090. Optical stack 2090 can, in some cases, replace optical stack 1290 in FIG. 1 and is laminated or bonded to liquid crystal panel 1280 via optical adhesive layer 1235. Optical stack 2090 includes optical diffuser layer 1220 disposed at output port 1204C, reflective polarizer layer 1250 disposed on the optical diffuser layer, optical film 1240 disposed, for example coated, on the reflective polarizer layer, and optical adhesive layer 1235 disposed on the optical film. In some cases, there can be one or more layers between any two neighboring layers in optical stack 2090 or optical construction 2000.

Figure 5:
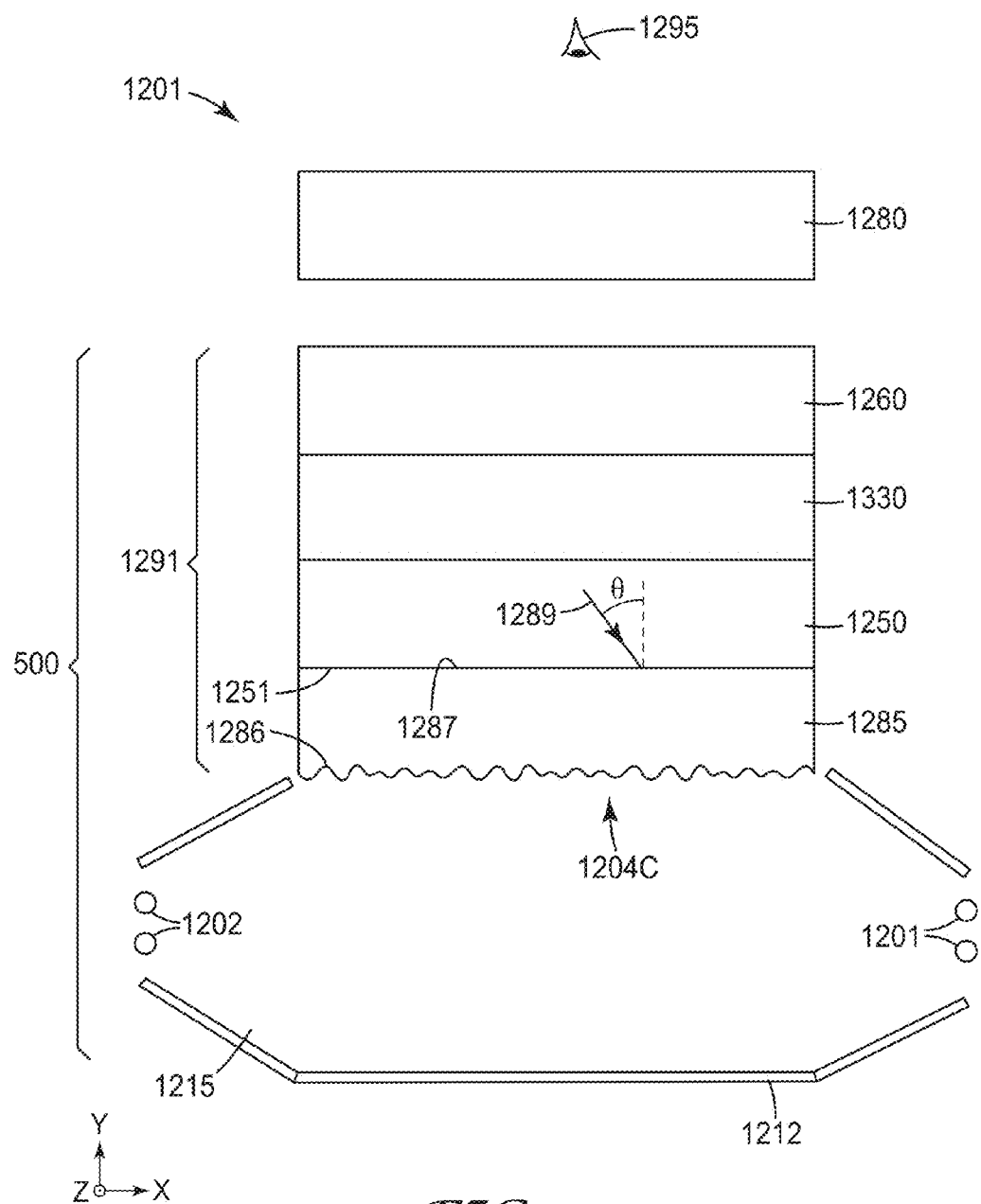
FIG. 5 is a schematic side-view of a display system.

FIG. 5 is a schematic side-view of a display system 1201 that includes liquid crystal panel 1280 disposed on a light source 500. The light source includes an optical stack 1291 that receives light from optically reflective cavity 1215. Optical stack 1291 includes a substantially forward scattering optical film 1285 that is disposed at output port 1204C of optically reflective cavity 1215, reflective polarizer layer 1250 disposed on the optical film, optical adhesive layer 1330 disposed on the reflective polarizer layer, and substrate 1260 disposed on the optical adhesive layer.

A first major surface 1251 of reflective polarizer layer 1250 faces optical film 1285. Optical film 1285 includes a first major surface 1286 that faces optically reflective cavity 1215 and a second major surface 1287 that faces the reflective polarizer layer and neighbors major surface 1251. Substantial portions of neighboring major surfaces 1251 and 1287 of the two neighboring layers 1250 and 1285 in optical stack 1291 are in physical contact with each other. For example, at least 50%, or at least 60%, or at least 70%, or at least 80%, or at least 90%, or at least 95% of the two neighboring major surfaces are in physical contact with each other.

In general, substantial portions of neighboring major surfaces (major surfaces that face each other or are adjacent to each other) of each two neighboring layers in optical stack 1291 are in physical contact with each other. For example, in some cases, there may be one or more additional layers, such as an adhesive layer and/or a substrate layer not expressly shown in FIG. 5, disposed in between reflective polarizer layer 1250 and optical film 1285. In such cases, substantial portions of neighboring major surfaces of each two neighboring layers in optical stack 1291 are in physical contact with each other. In such cases, at least 50%, or at least 60%, or at least 70%, or at least 80%, or at least 90%, or at least 95% of the neighboring major surfaces of each two neighboring layers in the optical construction are in physical contact with each other.

Substantially forward scattering optical film 1285 includes a plurality of voids, such as interconnected voids, dispersed in a binder. In some cases, optical film 1285 also includes a plurality of particles dispersed in the binder and/or the optical film. Optical film 1285 can be any optical film disclosed herein that includes voids and is substantially forward scattering. In some cases, optical film 1285 has a low optical haze and diffuse reflectance.

In some cases, optical film 1285 has a high optical haze. In such cases, the optical haze of the optical film is not less than about 30%, or not less than about 40%, or not less than about 50%, or not less than about 60%, or not less than about 70%, or not less than about 80%, or not less than about 90%. In some cases, optical film 1285 has a high diffuse optical reflectance. In such cases, the diffuse optical reflectance of the optical film is not less than about 30%, or not less than about 40%, or not less than about 50%, or not less than about 60%. In some cases, optical film 1285 has a low optical clarity. In such cases, the optical clarity of the optical film is not greater than about 70%, or not greater than about 60%, or not greater than about 50%, or not greater than about 40%, or not greater than about 30%, or not greater than about 20%, or not greater than about 10%.

In some cases, optical film 1285 has a high optical haze and manifests some-low-index like properties. For example, in such cases, optical film 1285 can support TIR or enhance internal reflection. For example, a light ray 1289 that is incident on the interface between the optical film and reflective polarizer layer 1250 with an incident angle θ, can under go TIR because the optical film has a low effective index. In some cases, it may not be possible to assign an effective index to the optical film because of, for example, high optical haze, but the optical film can still enhance internal reflection meaning that the reflection is greater than what the binder of the optical film would produce.

An advantage of optical stack 1291 is that optical film 1285 has high optical haze and can substantially scatter light while, at the same time, it can manifest some low-index properties. For example, optical stack 1291 can have an appreciable optical gain. For example, optical gain of optical stack 1291 can be at least about 1.1, or at least about 1.2, or at least about 1.2, or at least about 1.25, or at least about 1.3, or at least about 1.35, or at least about 1.4, or at least about 1.45, or at least about 1.5. As used herein, "gain" or "optical gain" of an optical stack is defined as the ratio of the axial output luminance of an optical or display system with the optical stack to the axial output luminance of the same optical or display system without the optical stack.

In the exemplary display system 1201, major surface 1286 of optical film 1285 is structured and can scatter light. In general, major surface 1286 can have any properties that may be desirable in an application. For example, in some cases, major surface 1285 can be smooth.

Optical adhesive layer 1330 bonds reflective polarizer layer 1250 to support substrate 1260. Optical adhesive layer can be similar to any optical adhesive layer disclosed herein, such as optical adhesive layers 1230 and 1235.

The display systems, light sources, and optically reflective cavities disclosed herein can have any shape and configuration that may be desirable in an application. For example, in some cases, a disclosed display system such as display system 1200, a disclosed light source such as light source 100, and/or a disclosed optically reflective cavity such as cavity 1215, can be planar or curved.

Figure 14:
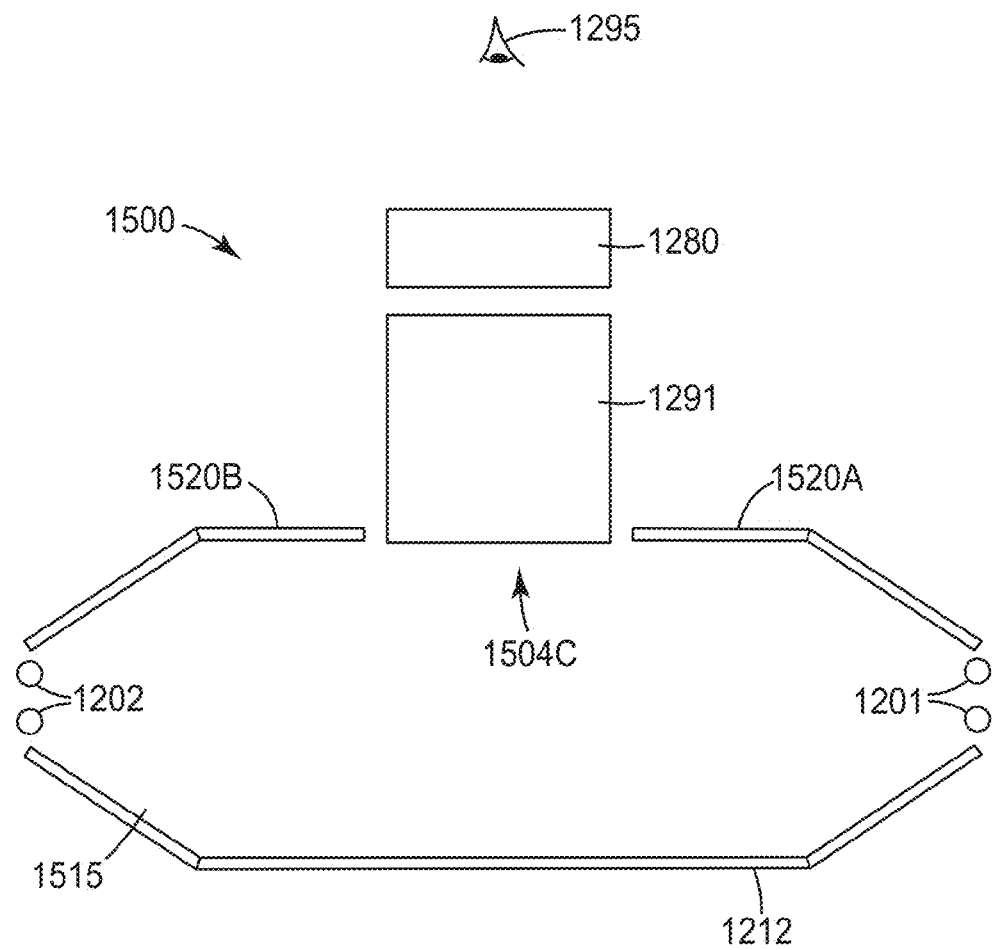
FIG. 14 is a schematic side-view of another display system.

In the exemplary display system 1201, output port 1204C is substantially the same size as back reflector 1212. In general, output port 1204C can have any size and/or shape that may be desirable in an application. For example, FIG. 14 is a schematic side-view of a display system 1500 that is similar to display system 1201 and includes optical stack 1291 disposed at an output port 1504C of an optically reflective cavity 1515, where output port 1504C is smaller than specular back reflector 1212. Optical cavity 1515 includes top specular reflectors 1520A and 1520B. In some cases, at least one of top reflectors 1520A and 1520B can be a semi-specular reflector.

Figure 15:
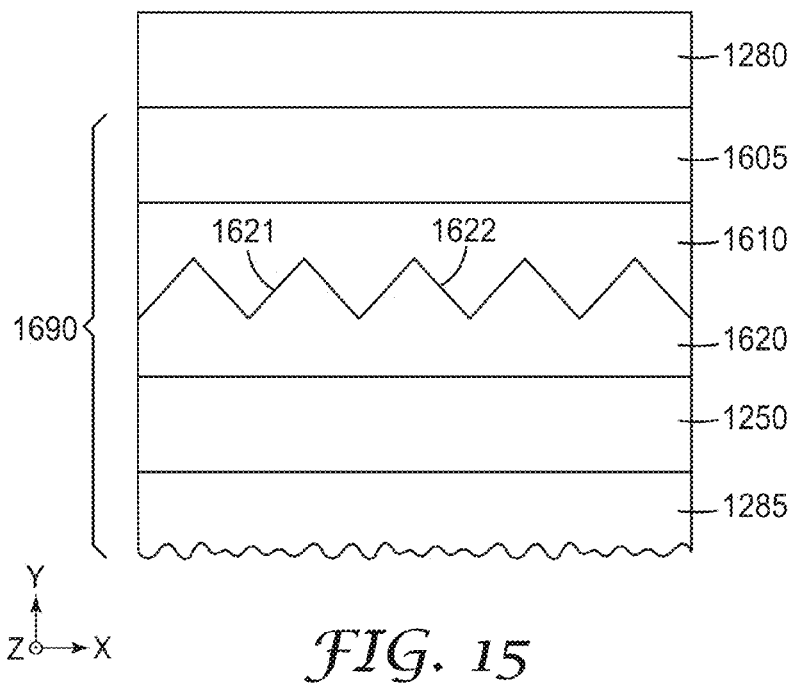
FIG. 15 is a schematic side-view of an optical stack.

Referring back to FIG. 5, in some cases, optical stack 1291 can have fewer layers or one or more additional layers. For example, FIG. 15 is a schematic side-view of an optical stack 1690 that can, for example, replace optical stack 1291. Optical stack 1690 is bonded to liquid crystal panel 1280 via an optical adhesive layer 1605. Optical stack 1690 includes optical film 1285, reflective polarizer layer 1250 disposed on optical film 1285, a structured light redirecting film 1620 disposed on the reflective polarizer layer, an optical film 1610 disposed on and planarizing the light redirecting film, and optical adhesive layer 1605 disposed on optical film 1610. Light redirecting film 1620 includes a structured top surface 1621 that includes a plurality of linear prisms 1622 extending along the z-direction. Optical film 1610 planarizes structured surface 1621 and optically couples to liquid crystal panel 1280 via optical adhesive layer 1605. Optical film 1610 can be any optical film disclosed herein. For example, in some cases, optical film 1610 includes voids dispersed in a binder and has an effective index of refraction that is not greater than about 1.3, or not greater than about 1.25, or not greater than about 1.2, or not greater than about 1.15, or not greater than about 1.1, or not greater than about 1.05. In some cases, the optical haze of optical film 1610 is not greater than about 5%, or not greater than about 4%, or not greater than about 3%, or not greater than about 2%, or not greater than about 1%, or not greater than about 0.5%.

Substantial portions of neighboring major surfaces (major surfaces that face each other or are adjacent to each other) of each two neighboring layers in optical stack 1690 are in physical contact with each other. In some cases, there may be one or more additional layers, such as an adhesive layer and/or a substrate layer not expressly shown in FIG. 15, disposed in between, for example, reflective polarizer layer 1250 and optical film 1285. In such cases, substantial portions of neighboring major surfaces of each two neighboring layers in optical stack 1690 are in physical contact with each other. In such cases, at least 50%, or at least 60%, or at least 70%, or at least 80%, or at least 90%, or at least 95% of the neighboring major surfaces of each two neighboring layers in the optical stack are in physical contact with each other.

Light redirecting film 1620 can be any film that includes structures capable of redirecting light. Examples of light redirecting films include brightness enhancement films (for example, BEF available from 3M Company, Saint Paul Minn.) and turning films (for example, an inverted BEF).

Figure 21:
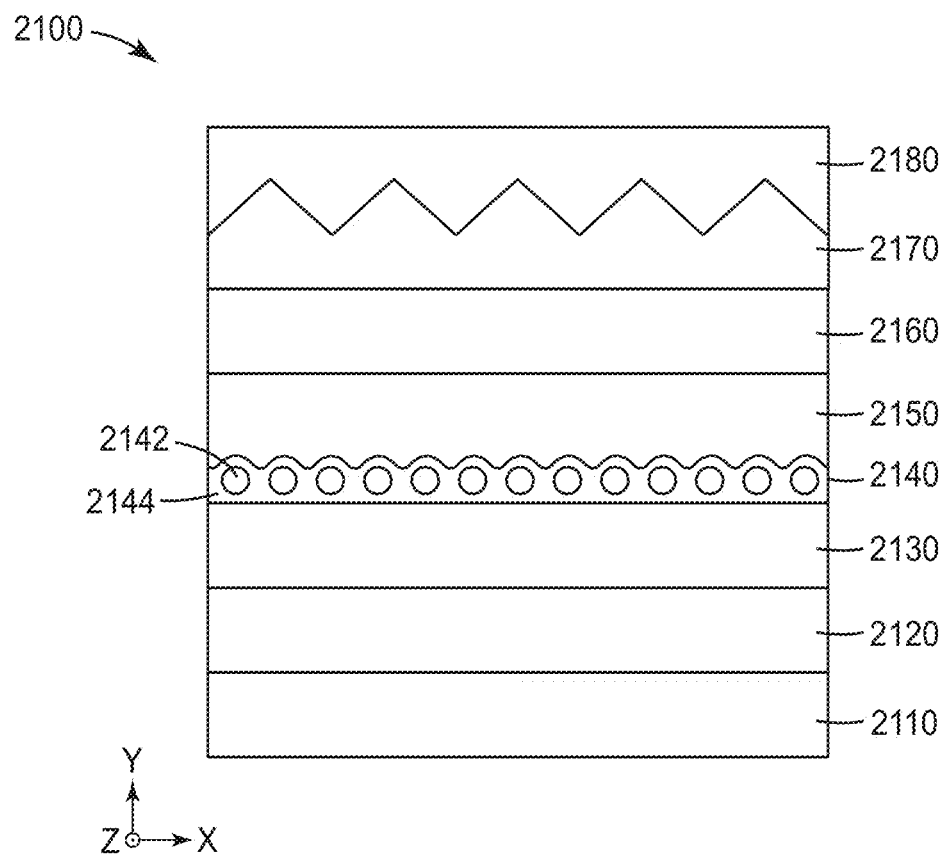
FIG. 21 is a schematic side-view of an optical stack.

As yet another example, FIG. 21 is a schematic side-view of an optical stack 2100 that can replace optical stack 1291 or any other optical stack disclosed herein. Optical stack 2100 includes a first light redirecting film 2110, a first optical film 2120 disposed on and planarizing the first light redirecting film, a first optical adhesive layer 2130 disposed on the first optical film, an optical diffuser layer 2140 disposed on the first optical adhesive layer, a second optical film 2150 disposed on and planarizing the optical diffuser layer, a second optical adhesive layer 2160 disposed on the second optical film, a second light redirecting layer 2170 disposed on the second optical adhesive layer, and a third optical film 2180 disposed on and planarizing the second light redirecting layer.

First and second light redirecting films 2110 and 2170 can be any light redirecting films that may be desirable in an application. For example, in some cases, light redirecting films 2110 and 2170 can be similar to light redirecting film 1620. In some cases, light redirecting films 2110 and 2170 include linear prismatic films with the linear prisms in one light redirecting film being oriented along a first direction and the linear prisms in the other light redirecting film being oriented along a second direction orthogonal to the first direction. For example, in some cases, the linear prisms in light redirecting film 2110 can extend, or be oriented, along the x-direction and the linear prisms in light redirecting film 2170 can extend, or be oriented, along the z-direction. In such cases and with optical stack 2100 disposed at, for example, output port 1204C, the prisms in first or lower light redirecting film 2110 can efficiently totally internally reflect substantial portions of light that is emitted by light sources 1201 and 1202 and travel along the general x-direction.

Optical films 2120, 2150 and 2180 can be nay optical films disclosed herein, such as optical films 1240 and 1285. For example, in some cases, the optical films include voids, such as interconnected voids, dispersed in a binder and have effective indices of refraction that are not greater than about 1.3, or not greater than about 1.25, or not greater than about 1.2, or not greater than about 1.15, or not greater than about 1.1, or not greater than about 1.05. In some cases, the optical haze of the optical films is not greater than about 5%, or not greater than about 4%, or not greater than about 3%, or not greater than about 2%, or not greater than about 1%, or not greater than about 0.5%.

Optical adhesive layers 2130 and 2160 can be any optical adhesive layer disclosed herein, such as optical adhesive layers 1230, 1235 and 1330. Optical diffuser layer 2140 can be similar to any optical diffuser layer disclosed herein, such as optical diffuser layer 1220. In some cases, optical diffuser layer includes a plurality of beads dispersed in a binder, where the beads form a top structured surface. In some cases, the index of the binder and the beads are substantially the same. In such cases, optical diffuser layer 2140 is substantially a surface diffuser and scatters no, or very little, light at a volume diffuser. In such cases, optical diffuser layer 2140 can enhance the optical gain of optical stack 2100.

Substantial portions of neighboring major surfaces (major surfaces that face each other or are adjacent to each other) of each two neighboring layers in optical stack 2100 are in physical contact with each other. In some cases, there may be one or more additional layers, such as an adhesive layer and/or a substrate layer not expressly shown in FIG. 21, disposed in between, for example, first optical film 2120 and first light redirecting film 2110. In such cases, substantial portions of neighboring major surfaces of each two neighboring layers in optical stack 2100 are in physical contact with each other. In such cases, at least 50%, or at least 60%, or at least 70%, or at least 80%, or at least 90%, or at least 95% of the neighboring major surfaces of each two neighboring layers in the optical stack are in physical contact with each other.

Figure 16:
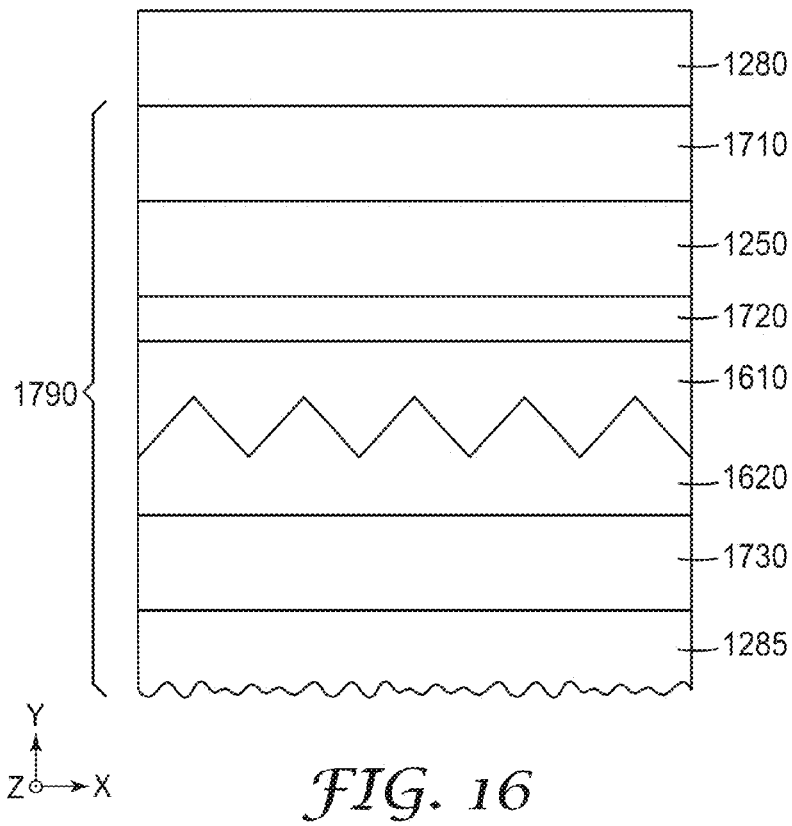
FIG. 16 is a schematic side-view of another optical stack.

As another example, FIG. 16 is a schematic side-view of an optical stack 1790 that can replace optical stack 1291. Optical stack 1790 is bonded to liquid crystal panel 1280 via an optical adhesive layer 1710 and includes optical film 1285, an optical film 1730 disposed on optical film 1285, light redirecting film 1620 disposed on optical film 1730, optical film 1610 disposed on and planarizing light redirecting film 1620, an optical adhesive layer 1720 disposed on optical film 1610, reflective polarizer layer 1250 disposed on optical adhesive layer 1720, and optical adhesive layer 1710 disposed on reflective polarizer layer 1250.

Optical film 1730 can be any optical film disclosed herein. For example, in some cases, optical film 1730 includes voids dispersed in a binder and has an effective index of refraction that is not greater than about 1.3, or not greater than about 1.25, or not greater than about 1.2, or not greater than about 1.15, or not greater than about 1.1, or not greater than about 1.05. In some cases, the optical haze of optical film 1730 is not greater than about 5%, or not greater than about 4%, or not greater than about 3%, or not greater than about 2%, or not greater than about 1%, or not greater than about 0.5%.

Substantial portions of neighboring major surfaces (major surfaces that face each other or are adjacent to each other) of each two neighboring layers in optical stack 1790 are in physical contact with each other. In some cases, there may be one or more additional layers, such as an adhesive layer and/or a substrate layer not expressly shown in FIG. 16, disposed in between, for example, light redirecting film 1620 and optical film 1730. In such cases, substantial portions of neighboring major surfaces of each two neighboring layers in optical stack 1790 are in physical contact with each other. In such cases, at least 50%, or at least 60%, or at least 70%, or at least 80%, or at least 90%, or at least 95% of the neighboring major surfaces of each two neighboring layers in the optical stack are in physical contact with each other.

Figure 13:
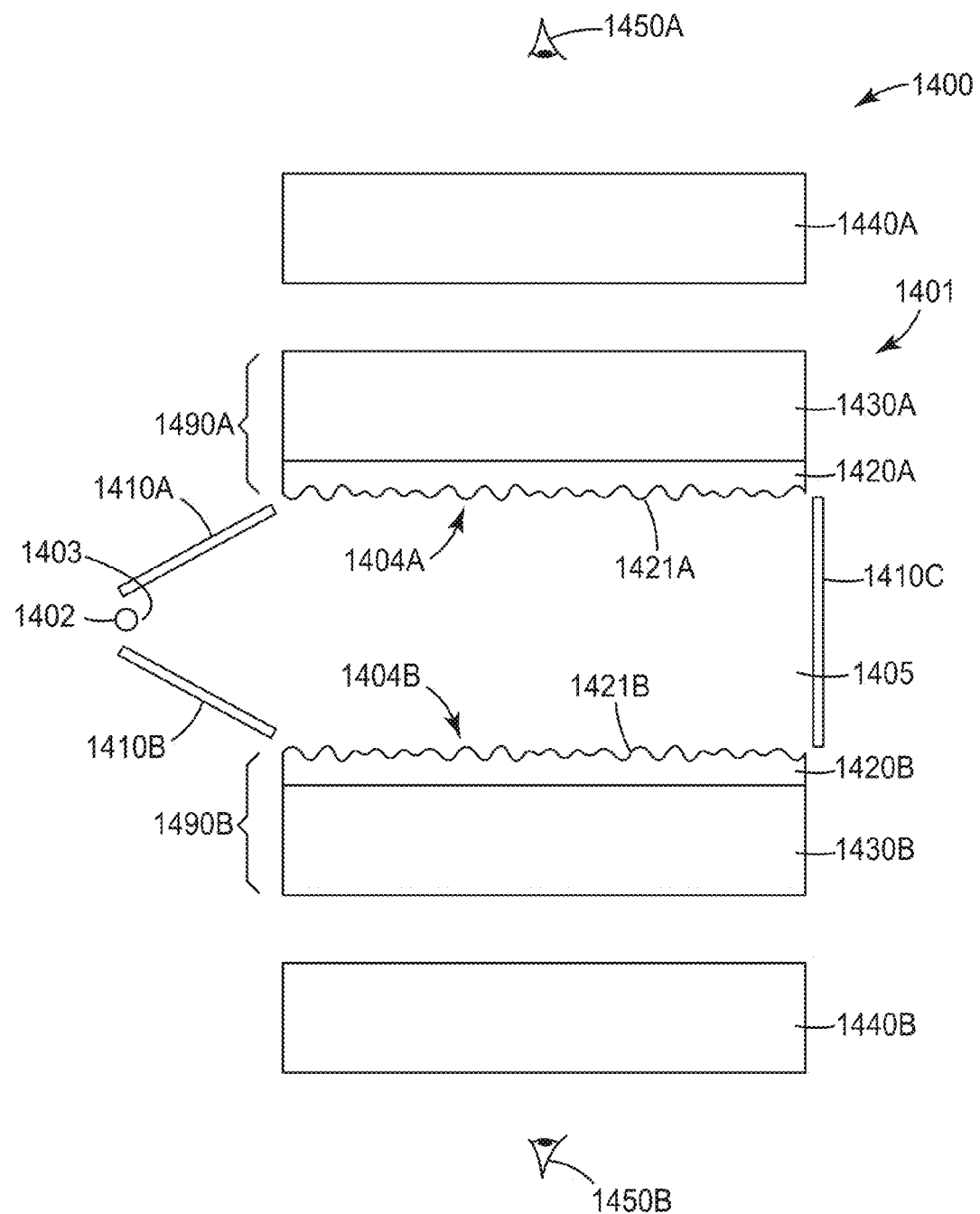
FIG. 13 is a schematic side-view of another display system.

FIG. 13 is a schematic side-view of a display system 1400 that includes a light source 1401 providing illumination to a first liquid crystal panel 1440A viewable by a viewer 1450A and a second liquid crystal panel 1440B viewable by a second viewer 1450B. Light source 1401 includes an optically reflective cavity 1405 that includes an input port 1403 receiving light from a lamp 1402, a first output port 1404A for transmitting light towards and illuminating first liquid crystal panel 1440A, and a second output port 1404B for transmitting light towards and illuminating second liquid crystal panel 1440B. Light source 1401 also includes a first optical stack 1490A disposed at first output port 1404A and a second optical stack 1490B disposed at second output port 1404B.

Optical reflective cavity includes respective first and second specular side reflectors 1410A and 1410B and specular end reflector 1410C. Each of optical stacks 1490A and 1490B includes a reflective polarizer layer disposed on an optical film. In particular, first optical stack 1490A includes a first optical film 1420A disposed at first output port 1404A and a first reflective polarizer layer 1430A disposed on first optical film 1420A, and second optical stack 1490B includes a second optical film 1420B disposed at second output port 1404B and a second reflective polarizer layer 1430B disposed on second optical film 1420A.

In some cases, at least one of first and second optical films 1420A and 1420B is a substantially forward scattering optical film. In such cases, the optical film has a transport ratio that is not less than about 0.2, or not less than about 0.3, or not less than about 0.4, or not less than about 0.5, or not less than about 0.6, or not less than about 0.8. Each of optical films 1420A and 1420B transmits a portion of an incident light and reflects another portion of the incident light. In some cases, the optical reflectance of at least one of optical films 1420A and 1420B is at least 40%, or at least 50%, or at least 60%, or at least 70%, or at least 80%, or at least 90%. In some cases, the optical transmittance of at least one of optical films 1420A and 1420B is not greater than about 30%, or not greater than about 25%, or not greater than about 20%, or not greater than about 15%, or not greater than about 10%. In some cases, such as when light source 1401 provides uniform illumination, the optical haze of at least one of substantially forward scattering optical films 1420A and 1420B is not less than about 20%, or not less than about 30%, or not less than about 40%, or not less than about 50%, or not less than about 60%, or not less than about 70%.

Substantial portions of neighboring major surfaces (major surfaces that face each other or are adjacent to each other) of each two neighboring layers in each of optical stacks 1490A and 1490B are in physical contact with each other. For example, in optical stack 1490A, substantial portions of the major bottom surface of first reflective polarizer layer 1430A and the major top surface of first optical film 1420A are in physical contact with each other. In such cases, at least 50%, or at least 60%, or at least 70%, or at least 80%, or at least 90%, or at least 95% of each two neighboring major surfaces are in physical contact with each other.

In general, substantial portions of neighboring major surfaces (major surfaces that face each other or are adjacent to each other) of each two neighboring layers in each of optical stacks 1490A and 1490B are in physical contact with each other. For example, in some cases, there may be one or more additional layers, such as an adhesive layer and/or a substrate layer not expressly shown in FIG. 13, disposed in between, for example, reflective polarizer layer 1430A and optical film 1420A. In such cases, substantial portions of neighboring major surfaces of each two neighboring layers in optical stack 1490A are in physical contact with each other. In such cases, at least 50%, or at least 60%, or at least 70%, or at least 80%, or at least 90%, or at least 95% of the neighboring major surfaces of each two neighboring layers in the optical stack are in physical contact with each other.

Each of optical films 1420A and 1420B includes a plurality of voids, such as interconnected voids, dispersed in a binder. In some cases, at least one of optical films 1420A and 1420B also includes a plurality of particles dispersed in the binder and/or the optical film. Optical films 1420A and 1420B can be any optical film disclosed herein that includes voids and is substantially forward scattering. In some cases, at least one of optical films 1420A and 1420B has a low optical haze and diffuse reflectance.

In some cases, at least one of optical films 1420A and 1420B has a high optical haze. In such cases, the optical haze of the optical film is not less than about 30%, or not less than about 40%, or not less than about 50%, or not less than about 60%, or not less than about 70%, or not less than about 80%, or not less than about 90%. In some cases, at least one of optical films 1420A and 1420B has a high diffuse optical reflectance. In such cases, the diffuse optical reflectance of the optical film is not less than about 30%, or not less than about 40%, or not less than about 50%, or not less than about 60%. In some cases, at least one of optical films 1420A and 1420B has a low optical clarity. In such cases, the optical clarity of the optical film is not greater than about 70%, or not greater than about 60%, or not greater than about 50%, or not greater than about 40%, or not greater than about 30%, or not greater than about 20%, or not greater than about 10%.

In some cases, at least one of optical films 1420A and 1420B has a high optical haze and manifests some-low-index like properties. For example, in such cases, each of first and second optical films 1420A and 1420B can support TIR or enhance internal reflection. In some cases, it may not be possible to assign an effective index to the optical film because of, for example, high optical haze, but the film can still enhance internal reflection meaning that the reflection is greater than what the binder of the optical film would produce.

An advantage of optical stacks 1490A and 1490B is that the optical films can have high optical haze and can substantially scatter light while, at the same time, they can manifest some low-index properties. For example, optical stack 1490A can have an appreciable optical gain. For example, optical gain of optical stack 1490A can be at least about 1.1, or at least about 1.2, or at least about 1.2, or at least about 1.25, or at least about 1.3, or at least about 1.35, or at least about 1.4, or at least about 1.45, or at least about 1.5.

In the exemplary display system 1400, major surface 1421A of optical film 1420A is structured and can scatter light, and major surface 1421B of optical film 1420B is structured and can scatter light. In general, each of major surfaces 1421A and 1421B can have any properties that may be desirable in an application. For example, in some cases, at least one of major surfaces 1421A and 1421B can be smooth.

In some cases, first reflective polarizer layer 1430A can be bonded to first liquid crystal panel 1440A via, for example, an optical adhesive layer, and second reflective polarizer layer 1430B can be bonded to second liquid crystal panel 1440B also via, for example, an optical adhesive layer not expressly shown in FIG. 13.

In the exemplary display system 1400, light source 1401 provides illumination to liquid crystal panels 1440A and 1440B for displaying images and/or information to, for example, viewers 1450A and 1450B. In some cases, light source 1401 can provide illumination in general lighting applications.

Figure 17:
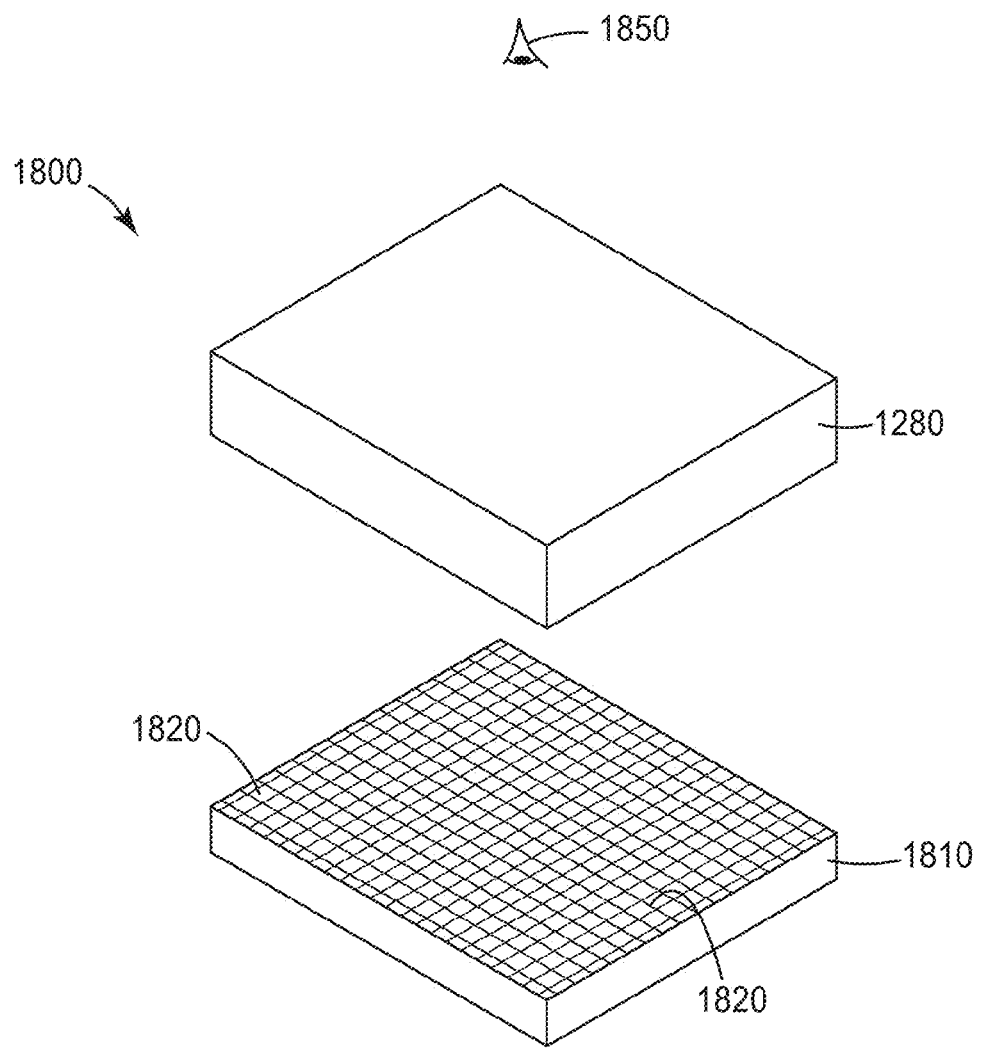
FIG. 17 is a schematic side-view of a display system.

FIG. 17 is a schematic three-dimensional view of a display system 1800 for displaying an image and/or data to a viewer 1850. The display system includes liquid crystal panel 1280 receiving light from a backlight 1810. Backlight 1810 includes a plurality of light sources 1820 that form an array, such as a regular array. Light sources 1820 can be any light source disclosed herein, such as light source 100 or 500. In some cases, each light source 1820 can be independently controlled. For example, in such cases, the brightness of light emitted by each light source can be independently controlled. In some cases, rows or columns of light source can be independently controlled.

In some cases, backlight 1810 can be actively and locally controlled by, for example, reducing the brightness of a zone of light sources 1820 that corresponds to a dark portion of a displayed image. Such active zonal control of light sources 1820 can reduce power consumption and enhance display contrast.

In some cases, backlight 1810 can be a tiled backlight or a tiled light source that includes a plurality of light source tiles 1820, where at least one of the light source tiles includes a light source disclosed herein. In some cases, the light source tiles can be interleaved meaning that portions of neighboring tiles overlap. In some cases, liquid crystal panel 1280 can be a monolithic image forming panel or a tiled image forming panel that includes a plurality of image forming tiles.

The exemplary display system 1800 has a rectangular shape display. In general, the display size and shape can be any size and shape that may be desirable in an application. For example, in some cases, the display can have a regular shape, such as a round shape or an elliptical shape. As another example, in some cases, the display can have an irregular shape.

Some of the advantages of the disclosed optical films, layers, stacks, and systems are further illustrated by the following examples. The particular materials, amounts and dimensions recited in these examples, as well as other conditions and details, should not be construed to unduly limit the present invention.

Example A

A coating solution "A" was made. First, 360 g of Nalco 2327 colloidal silica (40% wt solid) (available from Nalco Chemical Company, Naperville Ill.) and 300 g of solvent 1-methoxy-2-propanol were mixed together under rapid stirring in a 2-liter three-neck flask that was equipped with a condenser and a thermometer. Next, 22.15 g of Silquest A-174 silane (available from GE Advanced Materials, Wilton Conn.) was added. The mixture was stirred for 10 min. Next, an additional 400 g of 1-methoxy-2-propanol was added. The mixture was heated at 85° C. for 6 hours using a heating mantle. The resulting solution was allowed to cool down to room temperature. Next, most of the water and 1-methoxy-2-propanol solvents (about 700 g) were removed using a rotary evaporator under a 60° C. water-bath. The resulting solution was 44% wt A-174 modified 20 nm silica clear dispersed in 1-methoxy-2-propanol. Next, 70.1 g of this solution, 20.5 g of SR 444 (available from Sartomer Company, Exton Pa.), 1.375 g of photoinitiator Irgacure 184 (available from Ciba Specialty Chemicals Company, High Point N.C.), and 80.4 g of isopropyl alcohol were mixed together by stirring to form a homogenous coating solution A.

Example B

A coating procedure "B" was developed. First, a coating solution was syringe-pumped at a rate of 2.7 cc/min into a 20.3 cm wide slot-type coating die. The slot coating die uniformly distributed a 20.3 cm wide coating onto a substrate moving at 152 cm/min.

Next, the coating was polymerized by passing the coated substrate through a UV-LED cure chamber that included a quartz window to allow passage of UV radiation. The UV-LED bank included a rectangular array of 352 UV-LEDs, 16 down-web by 22 cross-web (approximately covering a 20.3 cm×20.3 cm area). The UV-LEDs were placed on two water-cooled heat sinks. The LEDs (available from Cree, Inc., Durham N.C.) operated at a nominal wavelength of 395 nm and were run at 45 Volts at 10 Amps, resulting in a UV-A dose of 0.108 joules per square cm. The UV-LED array was powered and fan-cooled by a Lambda GENH 60-12.5-U power supply (available from TDK-Lambda, Neptune N.J.). The UV-LEDs were positioned above the cure chamber quartz window at a distance of approximately 2.54 cm from the substrate. The UV-LED cure chamber was supplied with a flow of nitrogen at a flow rate of 46.7 liters/min (100 cubic feet per hour) resulting in an oxygen concentration of approximately 150 ppm in the cure chamber.

After being polymerized by the UV-LEDs, the solvent in the cured coating was removed by transporting the coating to a drying oven operating at 150° F. Next, the dried coating was post-cured using a Fusion System Model 1300P configured with an H-bulb (available from Fusion UV Systems, Gaithersburg Md.). The UV Fusion chamber was supplied with a flow of nitrogen that resulted in an oxygen concentration of approximately 50 ppm in the chamber.

Example 1

Figure 6:
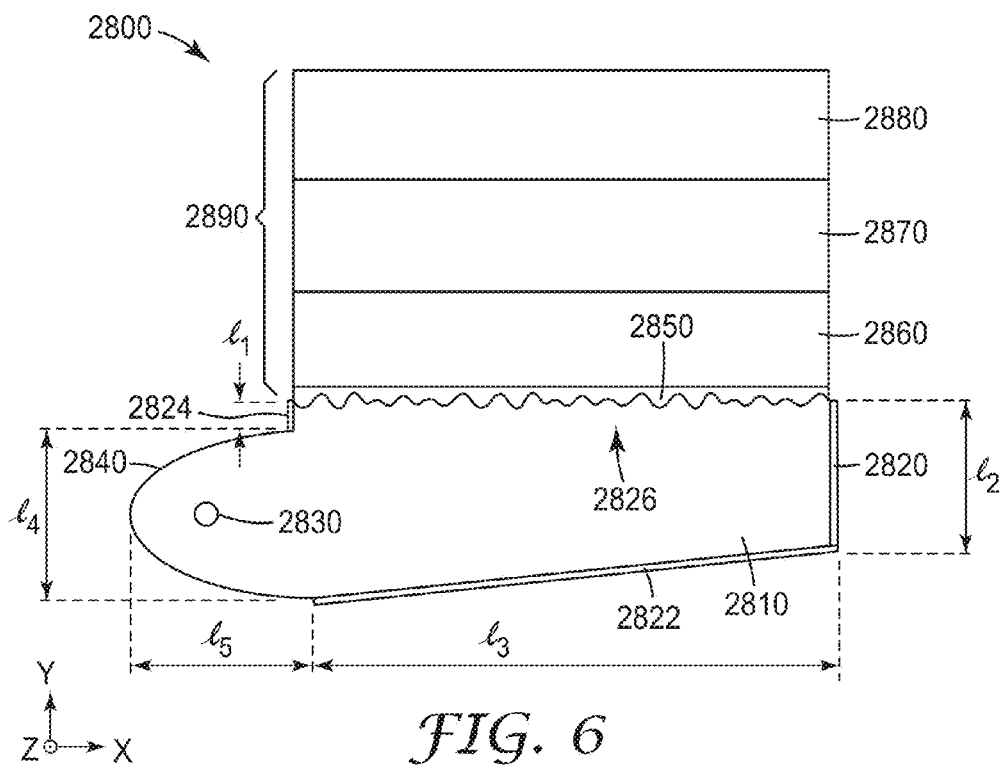
FIG. 6 is a schematic side-view of a light source.

A light source 2800, a side-view of which is schematically shown in FIG. 6, was made. Light source 2800 included an optically reflective hollow cavity 2810 and an optical stack 2890 that was placed at an open front port 2822 of the reflective cavity.

The optical cavity was wedge shaped and included a proximal side reflector 2824, a distal side reflector 2820, a bottom reflector 2822, and a lamp 2830 housed within a parabolic reflector 2840. The optical cavity had the following dimensions: $l_1=1$ mm, $l_2=16$ mm, $l_3=400$ mm, $l_4=17$ mm, and $l_5=21$ mm. Lamp 2830 included 12 white LEDs (available under the name Luxeon Rebel from Philips Lumiled Lighting Company, San Jose, Calif.). The LEDs were placed on heat sinks not expressly shown in FIG. 6.

The interiors of the parabolic reflector, the side reflectors and the bottom reflector were lined with ESR mirror films (available as from 3M Company, St. Paul Minn.) having a 99.5% reflectance in the visible. Optically reflective cavity 2810 had an open output port 2826 for transmitting light that was emitted by lamp 2830.

Optical stack 2890 included an optical diffuser 2850 coated on a reflective polarizer layer 2860. The reflective polarizer was laminated to a substrate 2880 via an optical adhesive layer 2870. Substrate 2880 was a 1.5 mm thick polycarbonate (PC) sheet. Optically clear adhesive 2870 was adhesive OCA 8173 (available from 3M Company, St. Paul Minn.).

Reflective polarizer layer 2860 had a pass axis along the x-axis and a block axis along the y-axis. The average on-axis (along the z-direction) reflectivity of the reflecting polarizer layer for incident light polarized along the x-axis (the pass axis) was about 68%, and the average on-axis (along the z-direction) reflectivity of the reflecting polarizer layer for incident light polarized along the y-axis (the block axis) was about 99.2%. The reflective polarizer layer was made as described in International Publication No. WO 2008/144656 filed on May 19, 2008, the disclosure of which is incorporated in its entirety herein by reference.

The reflective polarizer layer included 274 alternating microlayers of birefringent 90/10 coPEN material and Eastman Neostar Elastomer FN007 (available from Eastman Chemical, Kingsport Tenn.). The 274 alternating microlayers were arranged in a sequence of ¼ wave layer pairs, where the thickness gradient of the layers was designed to provide a strong reflection resonance broadly and uniformly across a bandwidth from approximately 400 nm to 1050 nm for one polarization axis, and a weaker reflection resonance broadly and uniformly across a bandwidth from approximately 400 nm to 900 nm for the orthogonal axis. Two 5 micron thick skin layers of PET-G were disposed on the outside surfaces of the coherent altering microlayer stack. The overall thickness of the reflective polarizer layer, including the alternating microlayers, the protective boundary layers and the skin layers, was approximately 40 microns. The refractive indices, measured at 633 nm, for the alternating 138 microlayers of 90/10 coPEN were $n_{x1}=1.805$, $n_{y1}=1.620$, and $n_{z1}=1.515$; and the indices for the 138 microlayers of FN007 were $n_{x2}=n_{y2}=n_{z2}=1.506$.

Optical diffuser 2850 was prepared using the method described in International Publication No. WO 2008/144656. The diffuser included a plurality of small particles dispersed in a binder. In particular, PMMA beads (MBX-20, available from Sekisui) having an average diameter of about 18 micrometers were dispersed in a solution of Iragacure 142437-73-01, IPA, and Cognis Photomer 6010 (available from Cognis North America, Cincinnati, Ohio). The solution was coated on reflective polarizer layer 2860 and UV cured, resulting in a dried coating thickness of approximately 40 microns. The dispersion of PMMA beads created a partial of hemispheric surface structure, randomly distributed spatially. The average radius of protrusion of the PMMA beads above the mean surface was estimated to be approximately 60% of the average bead radius. The dried matrix was formulated to have approximately the same refractive index as the PMMA beads, minimizing the bulk scattering within the coating.

Optical performance of light source 2800 was measured using an Autronic Conoscope Conostage 3 (available from Autronic-Melchers GmbH, Karlsruhe, Germany). LEDs 2830 were driven at 50 mA during the measurements. The axial luminance, maximum luminance, angles of maximum luminance (in degrees) along the x-axis (the down-lightguide direction) and the z-axis (the cross-lightguide direction) relative to the y-direction, and integrated intensity were measured and summarized in Table I.

TABLE I

Measured optical properties for Examples 1 and 2

| Example | Axial luminance (cd/m$^2$) | Maximum luminance (cd/m$^2$) | Angle of maximum luminance (z-axis) (degrees) | Angle of maximum luminance (x-axis) (degrees) | Integrated intensity (lm/m$^2$) |
|---|---|---|---|---|---|
| 1 | 1201.1 | 1214.8 | 63 | 270 | 2589.9 |
| 2 | 1274.4 | 1352.7 | 63 | 273 | 2890.8 |

Example 2

Figure 7:
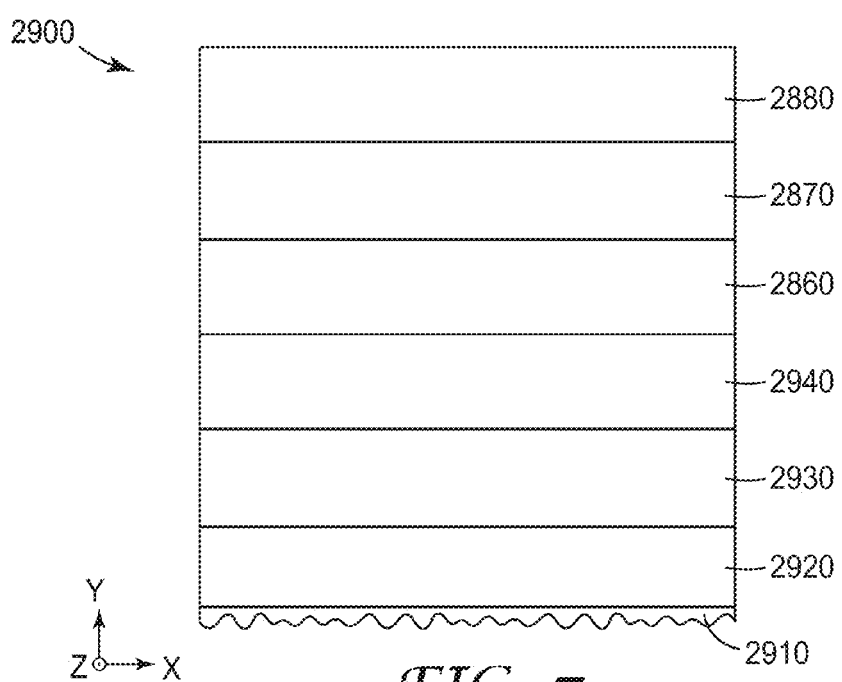
FIG. 7 is a schematic side-view of an optical stack.

A light source similar to light source 2800 was made except that optical stack 2890 was replaced with an optical stack 2900, a side-view of which is shown schematically in FIG. 7.

Optical stack 2900 included 1.5 mm thick PC substrate 2880, OCA 8173 optically clear adhesive layer 2870, reflective polarizer layer 2860 having the same optical properties as the reflective polarizer layer in optical stack 2890, an optical film 2940 coated on polarizer layer 2860, an optical diffuser 2910 similar to optical diffuser 2850 and coated on a substrate 2920, and an optical adhesive layer 2930 laminating substrate 2920 to optical film 2940. Optical stack 2900 was placed at output port 2826 of optically reflective cavity 2810 in FIG. 6.

Optical film 2940 was made by coating solution A from Example A on reflective polarizer layer 2860 using the coating method described in Example B, except that the syringe pump rate was 6 cc/min and the UV-LEDs were ran at 13 Amps (resulting in a UVA dose of 0.135 joules per square cm). The optical film had an index of refraction of about 1.22 and a thickness of about 5 microns.

Optical diffuser 2910 was prepared using the method described in International Publication No. WO 2008/144656. The diffuser included a plurality of small particles dispersed in a binder. In particular, PMMA beads (MB30X-8, available from Soken Chemical Company, Ltd, Tokyo Japan) having an average diameter of about 8 micrometers (22.5% by weight) were mixed with Cognis 6010 resin (15% by weight) (available as Photomer 6010 from Cognis North America, Cincinnati Ohio), photoinitiator Esacure (0.1% by weight) (available from Lamberti S.p.A., Gallarate, Italy), radiation curing silicone additive Tego Rad 2250 (0.1% by weight) (available from Evonik Goldschmidt Corporation, Hopewell Va.), and solvent Dowanol PM (61.9% by weight) (available from Dow Chemical Company, Midland Mich.). The components were mixed in a high shear mixer with the beads added last. The solution was coated on a 0.051 mm thick PET substrate 2920, dried and UV cured, resulting in a dried coating thickness of approximately 8 microns.

Optical performance of light source 2800 was measured using the procedure described in Example 1. The results are summarized in Table I.

Example 3

Figure 8:
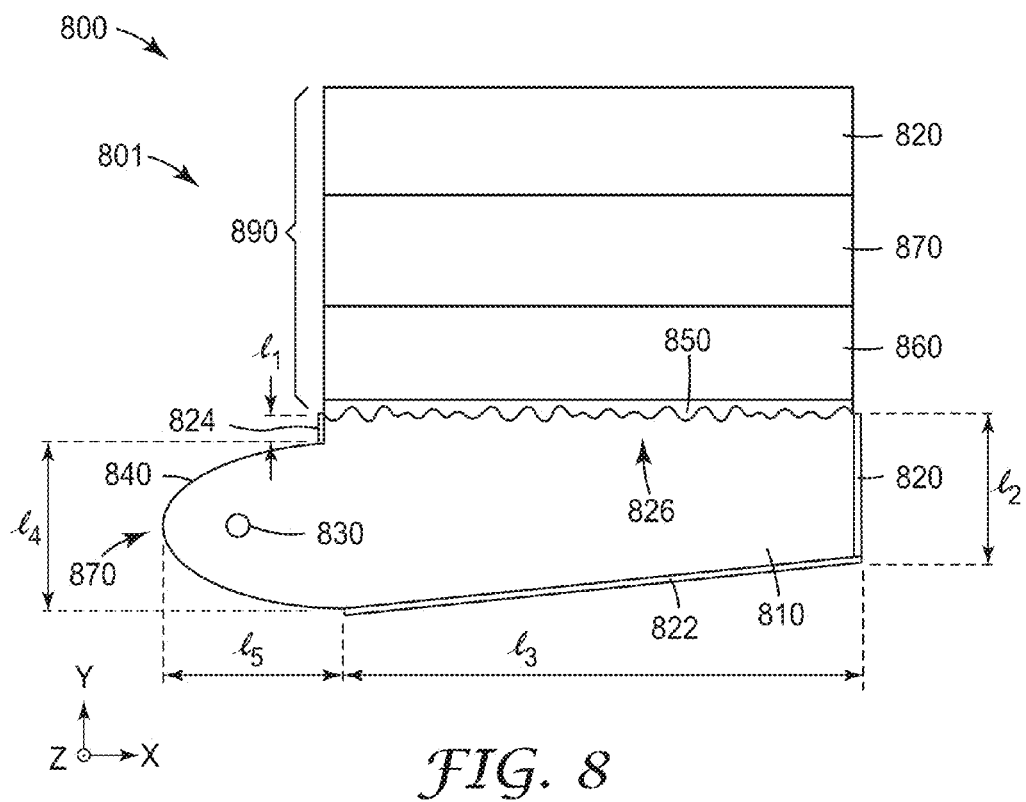
FIG. 8 is a schematic side-view of another display system.

A display system 800, a side-view of which is schematically shown in FIG. 8, was made. Display system 800 included a rectangular liquid crystal panel 820 disposed on an extended light source 801. Liquid crystal panel 820 had a length (x-direction) of about 895 mm and width (z-direction) of about 515 mm. The extended light source 801 had a rectangular emissive or light emitting area that was 705 mm long (x-direction) and 400 mm wide (z-direction). Extended light source 801 illuminated a similar size area of liquid crystal panel 820 that was smaller than the size of the panel.

Light source 801 included an optical stack 890 that was disposed on and received light from an optically reflective hollow cavity 810. The optical cavity had a proximal side reflector 824, a distal side reflector 820, a bottom reflector 822, and a lamp source assembly 870 that included six light engines. Each light engine included a lamp 830 that was housed within a parabolic reflector 840. Each lamp 830 included 12 cool white LEDs (available under the name Luxeon Rebel from Philips Lumiled Lighting Company, San Jose, Calif.) arranged in a linear array with a pitch of about 9.8 mm. The light engines were attached to aluminum heat sinks for thermal management. The optical cavity had the following dimensions: $l_1$=1 mm, $l_2$=17 mm, $l_3$=400 mm, $l_4$=17 mm, and $l_5$=21 mm. The interiors of the parabolic reflector, the side reflectors, and the bottom reflector were lined with ESR mirror films (available as from 3M Company, St. Paul Minn.) having a 99.5% reflectance in the visible. Optically reflective hollow cavity 810 had an open output port 826 for transmitting light that was emitted by lamps 830.

Optical stack 890 included an optical diffuser 850 coated on a reflective polarizer layer 860. The reflective polarizer was bonded to liquid crystal panel 820 via an optical adhesive layer 870. Reflective polarizer layer 860 was similar to reflective polarizer layer 2860 and was made as described in Example 1.

Optical diffuser 850 was prepared as follows: 15 kg of Photomer 6010 (available from Cognis USA, Cincinnati, Ohio) and 62.1 kg of 1-methoxy-2-propanol were combined under rapidly stirring until the Photomer 6010 was completely dissolved. Then, 0.1 Kg of Tego Rad 2250 (available from Evonik Goldschmidt Corp. Hopewell, Va.), 0.53 kg of Esacure ONE (available from Lamberti, Conshohocken, Pa.), and 22.5 kg of MB30X-8 (available from Sekisui Plastics Co, Ltd. Tokyo, Japan) were added and rapidly stirred until a homogenous coating solution was obtained. The resulting solution was then coated on reflective polarizer layer 860 using a coating pump at a pump rate of about 800 g/min with the reflective polarizer layer moving at about 30.5 m/min. Next, the coating was dried by passing it through a first oven at 160° F. and a second oven at 200° F. The dried coating was then UV cured using a Light Hammer 6 UV light source that included H bulbs (available from Fusion UV Systems, INC. Gaithersburg, Md.) and operated at 100% UV under nitrogen. The resulting coated reflective polarizer layer was laminated to liquid crystal panel 820 via optical adhesive layer 870 (adhesive OCA 8173 available from 3M Company, St. Paul Minn.).

Figure 9:
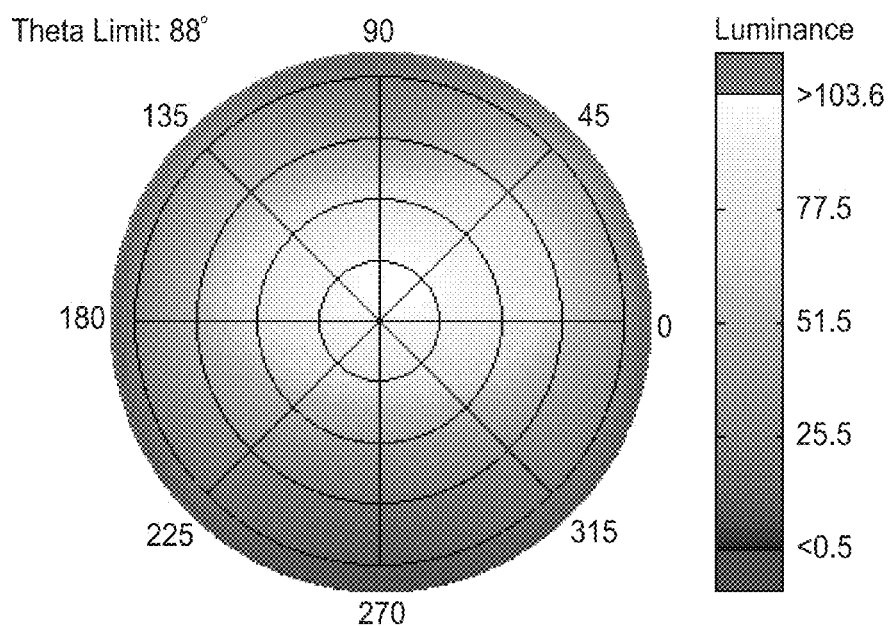
FIG. 9 is a grayscale conoscopic image of the measured luminance of a display system as a function of viewing angle.

Optical performance of display system 800 was measured using EZ Contrast XL 88W Conoscope (Model XL88W-R-111124, available from Eldim-Optics, Hérouville Saint-Clair France). The display system had an axial luminance of about 93 nits, a maximum luminance of about 100 nits, a contrast ratio of about 146, a viewing angle of about 63 degrees along the x-axis and a viewing angle of about 30 degrees along the z-axis. FIG. 9 is a grayscale conoscopic image of the measured luminance of display system 800 as a function of viewing angle. The grid overlaying the image is provided for reference purposes to show the azimuthal angle φ ranging from 0 to 360 degrees, and the polar angle θ ranging from 0 at the center to about 88 degrees at the periphery, with concentric circles provided for each 20 degree increment of θ.

Example 4

Figure 10:
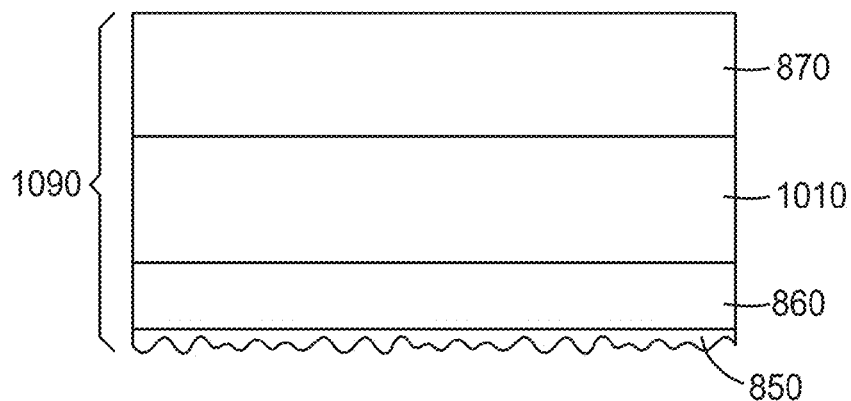
FIG. 10 is a schematic side-view of an optical stack.

A display system similar to display system 800 was made except that optical stack 890 was replaced with an optical stack 1090, a side-view of which is shown schematically in FIG. 10. Optical stack 1090 included optical diffuser 850 coated on the bottom major surface of reflective polarizer layer 860, optical film 1010 coated on the top major surface of reflective polarizer layer 860, and optical adhesive layer 870.

Optical film 1010 was prepared and coated on reflective polarizer layer 860 as follows. In a 2 liter three-neck flask, equipped with a condenser and a thermometer, 960 grams of IPA-ST-UP organosilica elongated particles (available from Nissan Chemical Inc., Houston, Tex.), 19.2 grams of deionized water, and 350 grams of 1-methoxy-2-propanol were mixed under rapid stirring. The elongated particles had a diameter in a range from about 9 nm to about 15 nm and a length in a range from about 40 nm to about 100 nm. The particles were dispersed in a 15.2% wt IPA. Next, 22.8 grams of Silquest A-174 silane (available from GE Advanced Materials, Wilton, Conn.) was added to the flask. The resulting mixture was stirred for 30 minutes. The mixture was kept at 81° C. for 16 hours. Next, the solution was allowed to cool down to room temperature. Next, about 950 grams of the solvent in the solution were removed using a rotary evaporator under a 40° C. water-bath, resulting in a 42.1% wt A-174-modified elongated silica clear dispersion in 1-methoxy-2-propanol.

Next, 95 grams of this clear dispersion, 26.8 grams of SR 444 (available from Sartomer Company, Exton, Pa.), 102 grams of isopropyl alcohol, 0.972 grams of photoinitiator Irgacure 184 and 0.167 grams of photoinitiator Irgacure 819 (both available from Ciba Specialty Chemicals Company, High Point N.C.) were mixed together and stirred resulting in a homogenous coating solution with 30.4% wt solids. Next, the coating solution was coated on the top major surface of reflective polarizer layer 860 using the coating method described below:

The coating solution was syringe-pumped at a rate of 2.5 cc/min into a 20.3 cm wide slot-type coating die. The slot coating die uniformly distributed a 20.3 cm wide coating onto a substrate moving at 152 cm/min. Next, the coating was polymerized by passing the coated reflective polarizer layer through a UV-LED cure chamber that included a quartz window to allow passage of UV radiation. The UV-LED bank included a rectangular array of 352 UV-LEDs (available from Cree, Inc., Durham, N.C.), 16 down-web (coating direction) by 22 cross-web (approximately covering a 20.3 cm×20.3 cm area). The UV-LEDs were placed on two water-cooled heat sinks. The UV-LEDs operated at a nominal wavelength of 395 nm and were run at 45 Volts at 13 Amps, resulting in a UV-A dose of about 0.1352 joules per square cm. The UV-LED array was powered and fan-cooled by a Lambda GENH 60-12.5-U power supply (available from TDK-Lambda, Neptune N.J.). The UV-LEDs were positioned above the cure chamber quartz window at a distance of approximately 2.54 cm from the reflective polarizer layer. The UV-LED cure chamber was supplied with a flow of nitrogen at a flow rate of 46.7 liters/min resulting in an oxygen concentration of approximately 150 ppm in the cure chamber.

After being polymerized by the UV-LEDs, the solvent in the cured coating was removed by transporting the coating on a web to a drying oven operating at 150° F. for 2 minutes at a web speed of about 152 cm/mim. Next, the dried coating was post-cured using a Fusion System Model 1300P configured with an H-bulb (available from Fusion UV Systems, Gaithersburg Md.). The UV Fusion chamber was supplied with a flow of nitrogen that resulted in an oxygen concentration of approximately 50 ppm in the chamber.

The resulting optical film 1010 had a thickness of about 5 microns and an effective refractive index of 1.16 measured using a Metricon Model 2010 Prism Coupler (available from Metricon Corp., Pennington, N.J.). A similar optical film 1010 coated on a 0.051 mm thick PET substrate had a total optical transmittance of about 94.9% and an optical haze of about 1.1% as measured with a Haze-Gard Plus haze meter (available from BYK-Gardiner, Silver Springs Md.).

Figure 11:
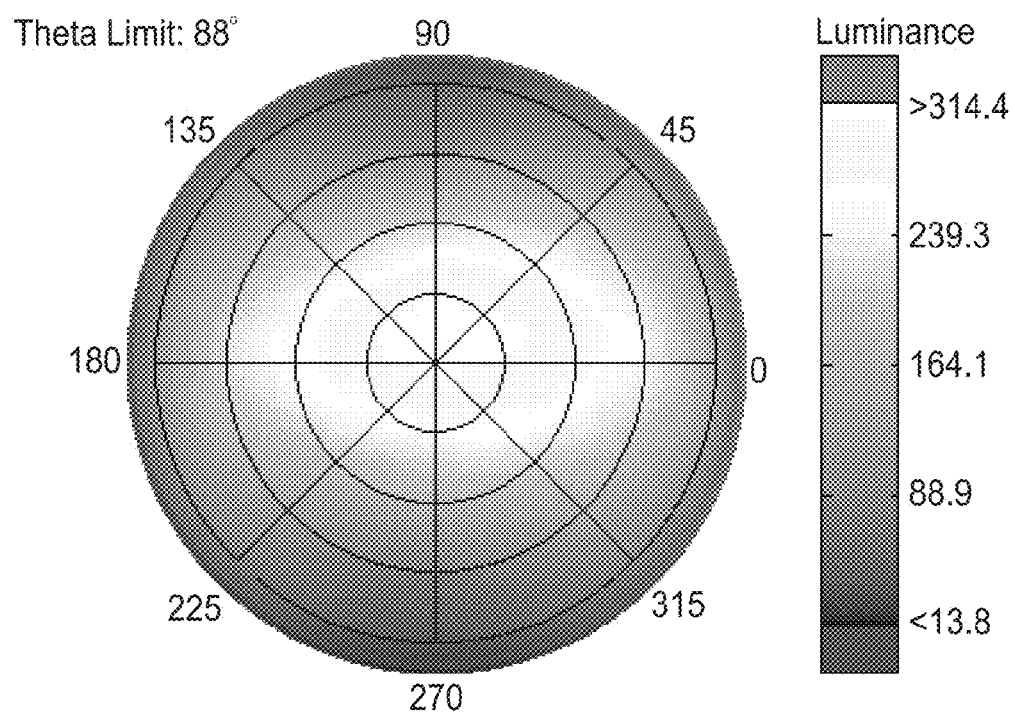
FIG. 11 is a grayscale conoscopic image of the measured luminance of another display system as a function of viewing angle.

The display system had an axial luminance of about 302 nits, a maximum luminance of about 312 nits, a contrast ratio of about 555, all of which were more than three times greater than the corresponding measurements reported in Example 3. The display system had a viewing angle of about 63 degrees along the x-axis and a viewing angle of about 35 degrees along the z-axis. FIG. 11 is a grayscale conoscopic image of the measured luminance of the display system as a function of viewing angle.

Item 1 is a light source comprising:
  an optically reflective hollow cavity comprising:
    one or more input ports for receiving light and an output port for transmitting light; and
    one or more lamps disposed at the one or more input ports; and
  an optical stack disposed at the output port and comprising:
    a substantially forward scattering optical diffuser disposed at the output port and having an optical haze that is not less than about 20%;
    an optical film disposed on the substantially forward scattering optical diffuser for enhancing total internal reflection at an interface between the optical film and the substantially forward scattering optical diffuser, the optical film having an index of refraction that is not greater than about 1.3 and an optical haze that is not greater than about 5%; and
    a reflective polarizer layer disposed on the optical film, wherein substantial portions of each two neighboring major surfaces in the optical stack are in physical contact with each other.

Item 2 is the light source of item 1, wherein a ratio of a maximum lateral dimension of the optically reflective hollow cavity to a maximum thickness of the optically reflective cavity is not less than about 20.

Item 3 is the light source of item 1, wherein a ratio of a maximum lateral dimension of the optically reflective hollow cavity to a maximum thickness of the optically reflective hollow cavity is not less than about 40.

Item 4 is the light source of item 1, wherein a ratio of a maximum lateral dimension of the optically reflective hollow cavity to a maximum thickness of the optically reflective hollow cavity is not less than about 60.

Item 5 is the light source of item 1, wherein the one or more lamps comprises one or more LEDs.

Item 6 is the light source of item 1, wherein the one or more input ports are located on opposite sides of the optically reflective hollow cavity and the output port is located on a top side of the optically reflective hollow cavity.

Item 7 is the light source of item 1, wherein the substantially forward scattering optical diffuser has a transport ratio that is not less than about 0.2.

Item 8 is the light source of item 1, wherein the substantially forward scattering optical diffuser has a transport ratio that is not less than about 0.3.

Item 9 is the light source of item 1, wherein the substantially forward scattering optical diffuser has a transport ratio that is not less than about 0.4.

Item 10 is the light source of item 1, wherein the substantially forward scattering optical diffuser has a transport ratio that is not less than about 0.5.

Item 11 is the light source of item 1, wherein the substantially forward scattering optical diffuser comprises a semi-specular partial reflector.

Item 12 is the light source of item 1, wherein the optical haze of the substantially forward scattering optical diffuser is not less than about 30%.

Item 13 is the light source of item 1, wherein the optical haze of the substantially forward scattering optical diffuser is not less than about 40%.

Item 14 is the light source of item 1, wherein the substantially forward scattering optical diffuser comprises a substantially forward scattering surface diffuser.

Item 15 is the light source of item 1, wherein the substantially forward scattering optical diffuser comprises a substantially forward scattering volume diffuser.

Item 16 is the light source of item 1, wherein the substantially forward scattering optical diffuser comprises a light scattering layer disposed on an optically transparent substrate.

Item 17 is the light source of item 1, wherein the effective index of refraction of the optical film is not greater than about 1.25.

Item 18 is the light source of item 1, wherein the effective index of refraction of the optical film is not greater than about 1.2.

Item 19 is the light source of item 1, wherein the effective index of refraction of the optical film is not greater than about 1.15.

Item 20 is the light source of item 1, wherein the effective index of refraction of the optical film is not greater than about 1.1.

Item 21 is the light source of item 1, wherein the optical haze of the optical film is not greater than about 4%.

Item 22 is the light source of item 1, wherein the optical haze of the optical film is not greater than about 3%.

Item 23 is the light source of item 1, wherein the optical haze of the optical film is not greater than about 2%.

Item 24 is the light source of item 1, wherein the optical film comprises a plurality of interconnected voids.

Item 25 is the light source of item 1, wherein the optical film comprises a binder and a plurality of interconnected voids.

Item 26 is the light source of item 1, wherein the optical film comprises a binder, a plurality of interconnected voids, and a plurality of particles.

Item 27 is the light source of item 1, wherein the optical film is laminated to the substantially forward scattering optical diffuser via an optical adhesive layer.

Item 28 is the light source of item 1, wherein the optical film is coated on the reflective polarizer layer.

Item 29 is the light source of item 1, wherein the optical stack comprises an optically adhesive layer disposed on the reflective polarizer layer.

Item 30 is the light source of item 1, wherein the reflective polarizer layer comprises a multilayer optical film comprising alternating layers, wherein at least one of the alternating layers comprises a birefringent material.

Item 31 is the light source of item 1, wherein the reflective polarizer layer comprises a wire grid reflective polarizer.

Item 32 is the light source of item 1, wherein the reflective polarizer layer comprises a plurality of substantially parallel fibers, the fibers comprising a birefringent material.

Item 33 is the light source of item 1, wherein the reflective polarizer layer comprises a cholesteric reflective polarizer.

Item 34 is the light source of item 1, wherein the reflective polarizer layer comprises a diffusely reflective polarizing film (DRPF).

Item 35 is the light source of item 1, wherein the optically reflective hollow cavity comprises one or more specularly reflective side reflectors, light that is emitted by the one or lamps being collimated by the one or more specularly reflective side reflectors along a lateral direction of the optically reflective hollow cavity.

Item 36 is the light source of item 1, wherein the optically reflective hollow cavity comprises a specularly reflective reflector facing the output port.

Item 37 is the light source of item 36, wherein the output port is smaller than the specularly reflective reflector.

Item 38 is the light source of item 1, wherein the optical reflective hollow cavity comprises one or more specular reflectors.

Item 39 is the light source of item 38, wherein the one or more specular reflectors include one or more enhanced specular reflectors (ESRs).

Item 40 is the light source of item 1, wherein at least 50% of each two neighboring major surfaces in the optical stack are in physical contact with each other.

Item 41 is the light source of item 1, wherein at least 70% of each two neighboring major surfaces in the optical stack are in physical contact with each other.

Item 42 is the light source of item 1, wherein at least 90% of each two neighboring major surfaces in the optical stack are in physical contact with each other.

Item 43 is the light source of item 1, wherein the optical film is disposed between the reflective polarizer layer and the substantially forward scattering optical diffuser.

Item 44 is a backlight for providing illumination in a display system, the backlight comprising the light source of item 1.

Item 45 is a display system comprising the light source of item 1 and a liquid crystal panel disposed on the optical stack.

Item 46 is the display system of item 45, wherein the optical stack is bonded to the liquid crystal panel via a removable adhesive.

Item 47 is the display system of item 45, wherein the optical stack is bonded to the liquid crystal panel via a repositionable adhesive.

Item 48 is the light source of item 1, wherein the optically reflective hollow cavity further comprises an optical element disposed near an input port in the one or more input ports, the optical element comprising an optical filter, an asymmetric optical diffuser, a wavelength converter, or a light collimator.

Item 49 is a tiled light source comprising a plurality of light source tiles, at least one of the plurality of light source tiles comprising the light source of item 1.

Item 50 is a display system comprising the tiled light source of item 49.

Item 51 is the display system of item 50 comprising a monolithic image forming panel.

Item 52 is the display system of item 50 comprising a tiled image forming panel.

Item 53 is a light source comprising:
an optically reflective hollow cavity comprising:
one or more input ports for receiving light and an output port for transmitting light; and
one or more lamps disposed at the one or more input ports; and
an optical stack disposed at the output port and comprising:
a substantially forward scattering optical film disposed at the output port and having an optical haze that is not less than about 30%; and
a reflective polarizer layer disposed on the optical film, wherein substantial portions of each two neighboring major surfaces in the optical stack are in physical contact with each other.

Item 54 is the light source of item 53, wherein a ratio of a maximum lateral dimension of the optically reflective hollow cavity to a maximum thickness of the optically reflective hollow cavity is not less than about 20.

Item 55 is the light source of item 53, wherein a ratio of a maximum lateral dimension of the optically reflective hollow cavity to a maximum thickness of the optically reflective hollow cavity is not less than about 40.

Item 56 is the light source of item 53, wherein a ratio of a maximum lateral dimension of the optically reflective hollow cavity to a maximum thickness of the optically reflective hollow cavity is not less than about 60.

Item 57 is the light source of item 53, wherein the one or lamps comprise one or more LEDs.

Item 58 is the light source of item 53, wherein the one or more input ports are located on opposite sides of the optically reflective hollow cavity and the output port is located on a top side of the optically reflective hollow cavity.

Item 59 is the light source of item 53, wherein the substantially forward scattering optical film has a transport ratio that is not less than about 0.2.

Item 60 is the light source of item 53, wherein the substantially forward scattering optical film has a transport ratio that is not less than about 0.3.

Item 61 is the light source of item 53, wherein the substantially forward scattering optical film has a transport ratio that is not less than about 0.4.

Item 62 is the light source of item 53, wherein the substantially forward scattering optical film has a transport ratio that is not less than about 0.5.

Item 63 is the light source of item 53, wherein the optical haze of the substantially forward scattering optical film is not less than about 40%.

Item 64 is the light source of item 53, wherein the optical haze of the substantially forward scattering optical film is not less than about 50%.

Item 65 is the light source of item 53, wherein the substantially forward scattering optical film comprises a plurality of interconnected voids.

Item 66 is the light source of item 53, wherein the substantially forward scattering optical film comprises a binder and a plurality of interconnected voids.

Item 67 is the light source of item 53, wherein the substantially forward scattering optical film comprises a binder, a plurality of interconnected voids, and a plurality of particles.

Item 68 is the light source of item 53, wherein the substantially forward scattering optical film is laminated to the reflective polarizer layer via an optical adhesive layer.

Item 69 is the light source of item 53, wherein the substantially forward scattering optical film is coated on the reflective polarizer layer.

Item 70 is the light source of item 53, wherein the optical stack comprises an optically adhesive layer disposed on the reflective polarizer layer.

Item 71 is the light source of item 53, wherein the reflective polarizer layer comprises a multilayer optical film comprising alternating layers, wherein at least one of the alternating layers comprises a birefringent material.

Item 72 is the light source of item 53, wherein the reflective polarizer layer comprises a wire grid reflective polarizer.

Item 73 is the light source of item 53, wherein the reflective polarizer layer comprises a plurality of substantially parallel fibers, the fibers comprising a birefringent material.

Item 74 is the light source of item 53, wherein the reflective polarizer layer comprises a cholesteric reflective polarizer.

Item 75 is the light source of item 53, wherein the reflective polarizer layer comprises a diffusely reflective polarizing film (DRPF).

Item 76 is the light source of item 53, wherein the optically reflective hollow cavity comprises one or more specularly reflective side reflectors, light that is emitted by the one or lamps being collimated by the one or more specularly reflective side reflectors along a lateral direction of the optically reflective hollow cavity.

Item 77 is the light source of item 53, wherein the optically reflective hollow cavity comprises a specularly reflective reflector facing the output port.

Item 78 is the light source of item 53, wherein the optical reflective hollow cavity comprises one or more specular reflectors.

Item 79 is the light source of item 53, wherein the one or more specular reflectors include one or more enhanced specular reflectors (ESRs).

Item 80 is the light source of item 53, wherein at least 50% of each two neighboring major surfaces in the optical stack are in physical contact with each other.

Item 81 is the light source of item 53, wherein at least 70% of each two neighboring major surfaces in the optical stack are in physical contact with each other.

Item 82 is the light source of item 53, wherein at least 90% of each two neighboring major surfaces in the optical stack are in physical contact with each other.

Item 83 is a backlight for providing illumination in a display system, the backlight comprising the light source of item 53.

Item 84 is a display system comprising the light source of item 53 and a liquid crystal panel disposed on the optical stack.

Item 85 is a light source comprising:
an optically reflective hollow cavity comprising:
one or more input ports for receiving light and an output port for transmitting light; and
one or more lamps disposed at the one or more input ports; and
an optical stack disposed at the output port and comprising:
a substantially forward scattering optical diffuser disposed at the output port and having an optical haze that is not less than about 20%;
an optical film disposed on the substantially forward scattering optical diffuser for enhancing total internal reflection at an interface between the optical film and the substantially forward scattering optical diffuser, the optical film having an index of refraction that is not greater than about 1.3 and an optical haze that is not greater than about 5%; and
a partially reflective partially transmissive layer disposed on the optical film, wherein substantial portions of each two neighboring major surfaces in the optical stack are in physical contact with each other.

Item 86 is a light source comprising:
an optically reflective hollow cavity comprising:
one or more input ports for receiving light;
first and second output ports for transmitting light; and
one or more lamps disposed at the one or more input ports; and
first and second optical stacks disposed at respective first and second output ports, each optical stack comprising:
an optical film having an optical haze that is not less than about 30%; and
a reflective polarizer layer disposed on the optical film, substantial portions of each two neighboring major surfaces in the optical stack being in physical contact with each other.

Item 87 is a display system comprising:
a first liquid crystal panel disposed on the first optical stack of the light source of item 86; and a second liquid crystal panel disposed on the second optical stack of the light source of item 86.

As used herein, terms such as "vertical", "horizontal", "above", "below", "left", "right", "upper" and "lower", "top" and "bottom", "clockwise" and "counter clockwise" and other similar terms, refer to relative positions as shown in the figures. In general, a physical embodiment can have a different orientation, and in that case, the terms are intended to refer to relative positions modified to the actual orientation of the device. For example, even if display system 1200 in FIG. 1 is flipped as compared to the orientation in the figure, reflector 1212 is still considered to be a "bottom" reflector.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. A light source comprising:
    an optically reflective hollow cavity comprising:
    one or more input ports for receiving light and an output port for transmitting light; and
        one or more lamps disposed at the one or more input ports; and
    an optical stack disposed at the output port and comprising:
        a substantially forward scattering optical diffuser disposed at the output port and having an optical haze that is not less than about 20% and a transport ratio that is not less than about 0.2;
        an optical film disposed on the substantially forward scattering optical diffuser for enhancing total internal reflection at an interface between the optical film and the substantially forward scattering optical diffuser, the optical film having an index of refraction that is not greater than about 1.3 and an optical haze that is not greater than about 5%; and
        a reflective polarizer layer disposed on the optical film, wherein substantial portions of each two neighboring major surfaces in the optical stack are in physical contact with each other;
    wherein the optical film includes a plurality of voids.

2. The light source of claim 1, wherein plurality of voids of the optical film include a plurality of interconnected voids.

3. The light source of claim 1, further comprising a wavelength converter disposed within the optically reflective hollow cavity.

4. The light source of claim 1, wherein the optically reflective hollow cavity further comprises a back reflector facing the output port.

5. The light source of claim 4, wherein the reflective polarizer layer is non-parallel to the back reflector.

6. The light source of claim 4, wherein one or both of the reflective polarizer layer and the back reflector is non-planar.

7. The light source of claim 4, wherein the output port is smaller than the back reflector.

8. The light source of claim 1, wherein the optical stack further comprises a light redirecting film disposed on the reflective polarizer layer.

9. A tiled light source comprising a plurality of light source tiles that can be individually controlled, at least one of the plurality of light source tiles comprising the light source of claim 1.

10. The light source of claim 1, wherein the light source is configured to provide illumination for general lighting applications.

* * * * *